(12) United States Patent
Brody

(10) Patent No.: US 10,540,575 B1
(45) Date of Patent: Jan. 21, 2020

(54) EPHEMERAL CONTENT MANAGEMENT

(71) Applicant: Snap Inc., Santa Monica, CA (US)

(72) Inventor: Jonathan Brody, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 250 days.

(21) Appl. No.: 15/640,106

(22) Filed: Jun. 30, 2017

Related U.S. Application Data

(63) Continuation of application No. 15/247,697, filed on Aug. 25, 2016, now Pat. No. 10,157,333.

(60) Provisional application No. 62/358,461, filed on Jul. 5, 2016.

(51) Int. Cl.
| | |
|---|---|
| *G06K 9/62* | (2006.01) |
| *G06N 3/08* | (2006.01) |
| *G06T 1/00* | (2006.01) |
| *G06F 16/58* | (2019.01) |

(52) U.S. Cl.
CPC ....... *G06K 9/6267* (2013.01); *G06F 16/5866* (2019.01); *G06N 3/08* (2013.01); *G06T 1/0007* (2013.01)

(58) Field of Classification Search
None
See application file for complete search history.

(56) References Cited

U.S. PATENT DOCUMENTS

| | | | |
|---|---|---|---|
| 6,038,295 A | 3/2000 | Mattes | |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,489,115 B2 | 7/2013 | Roeriguez | |

(Continued)

FOREIGN PATENT DOCUMENTS

| | | |
|---|---|---|
| CA | 2887596 A1 | 7/2015 |
| WO | WO-2017100476 A1 | 6/2017 |

OTHER PUBLICATIONS

Andreas Girgehnson "Leveraging Face Recognition Technology to Find and Organize Photos" MIR 2004.*

(Continued)

*Primary Examiner* — Mark Roz
(74) *Attorney, Agent, or Firm* — Schwegman Lundberg & Woessner, P.A.

(57) ABSTRACT

Systems, methods, devices, media, and computer-readable instructions are described for local image tagging and processing in a resource-constrained environment such as a mobile device. In some embodiments, characteristics associated with images are used to determine whether to store content (e.g., images and video clips) as ephemeral content or non-ephemeral content. Based on the determination, the image is stored in a non-ephemeral camera roll storage of the mobile device, or an ephemeral local application storage. Additional storage operations such as encryption or backup copying may additionally be determined and performed based on the analysis of the content. In some embodiments, such images may be indexed, sorted, and searched based on the image tagging operations used to characterize the content.

20 Claims, 17 Drawing Sheets

(56) References Cited

U.S. PATENT DOCUMENTS

| | | |
|---|---|---|
| 8,718,333 B2 | 5/2014 | Wolf et al. |
| 8,724,622 B2 | 5/2014 | Rojas |
| 8,819,035 B2 | 8/2014 | Boetje |
| 8,850,490 B1 | 9/2014 | Thomas et al. |
| 8,874,677 B2 | 10/2014 | Rosen et al. |
| 8,892,588 B2 | 11/2014 | Bennett |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,665,799 B1 | 5/2017 | Munteanu et al. |
| 10,157,333 B1 | 12/2018 | Wang et al. |
| 2009/0012940 A1 | 1/2009 | Ives et al. |
| 2010/0114876 A1 | 5/2010 | Mandel et al. |
| 2010/0214936 A1 | 8/2010 | Ito et al. |
| 2011/0061028 A1 | 3/2011 | Bachman et al. |
| 2011/0202598 A1 | 8/2011 | Evans et al. |
| 2012/0166472 A1 | 6/2012 | Hoppenot et al. |
| 2012/0209924 A1 | 8/2012 | Evans et al. |
| 2012/0294520 A1 | 11/2012 | Mei et al. |
| 2013/0177296 A1 | 7/2013 | Geisner et al. |
| 2014/0089815 A1 | 3/2014 | Gildfind et al. |
| 2014/0188894 A1 | 7/2014 | Chechik et al. |
| 2014/0337346 A1 | 11/2014 | Barthel et al. |
| 2015/0010289 A1 | 1/2015 | Lindblom |
| 2015/0052431 A1 | 2/2015 | Zhu et al. |
| 2015/0254356 A1 | 9/2015 | Skrenta et al. |
| 2015/0324395 A1 | 11/2015 | Arnold et al. |
| 2017/0161382 A1 | 6/2017 | Ouimet et al. |
| 2017/0206450 A1 | 7/2017 | Umeda |

OTHER PUBLICATIONS

"U.S. Appl. No. 15/247,697, Notice of Allowance dated Aug. 8, 2018".

"U.S. Appl. No. 15/247,697, Examiner Interview Summary dated Aug. 8, 2018".

"U.S. Appl. No. 15/247,697, Corrected Notice of Allowability dated Sep. 21, 2018", 13 pgs.

"How to Search by Image on Google", Google, [Online]. Retrieved from the Internet: <URL: http://www.wikihow.com/Search-by-Image-on-Google, (Accessed Nov. 17, 2015), 3 pgs.

"International Application Serial No. PCT/US2016/065660, International Search Report dated May 2, 2017", 7 pgs.

"International Application Serial No. PCT/US2016/065660, Invitation to Pay Add'l Fees and Partial Search Rpt dated Mar. 3, 2017", 6 pgs.

"International Application Serial No. PCT/US2016/065660, Written Opinion dated May 2, 2017", 13 pgs.

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

"U.S. Appl. No. 16/192,419, Non Final Office Action dated Apr. 9, 2019", 26 pgs.

Chetlur, Sharan, "cuDNN: Efficient Primitives for Deep Learning", arXiv:1410.0759v3, (Dec. 18, 2014), 9 pgs.

Huynh, Loc N, "DeepSense: A GPU-based Deep Convolutional Neural Network Framework on Commodity Mobile Devices", Proc. of the ACM Workshop on Wearable Systems and Applications, (2016), 6 pgs.

Li, H., "Interactive Multimodal Visual Search on Mobile Device", IEEE Transactions on Multimedia, vol. 15, No. 3, (Apr. 2013), 594-607.

Long, Jonathan, "Fully Convolutional Networks for Semantic Segmentation", IEEE Conference on Computer Vision and Pattern Recognition (CVPR), Boston, MA, (Jun. 2015), 10 pgs.

Vallet, Alexis, "A Multi-Label Convolutional Neural Network for Automatic Image Annotation", Journal of Information Processing, vol. 23, No. 6, (Nov. 2015), 10 pgs.

* cited by examiner

US 10,540,575 B1

EPHEMERAL CONTENT MANAGEMENT

PRIORITY CLAIM

This application claims the benefit of priority to U.S. Provisional Patent Application Ser. No. 62/358,461, filed Jul. 5, 2016, entitled "SYSTEMS AND METHODS FOR CONTENT MESSAGING AND STORAGE." and this application is a continuation of and claims the benefit of U.S. patent application Ser. No. 15/247,697, filed Aug. 25, 2016, entitled, "SYSTEMS AND METHODS FOR CONTENT TAGGING," each of which are incorporated herein by reference in their entirety.

TECHNICAL FIELD

Embodiments of the present disclosure relate generally to computing systems and networks for image management and sharing, as well as image processing and automated organization and storage of images. Some embodiments relate to application-based local storage with ephemeral messaging and publication. Some embodiments relate to security with application-based storage. Some embodiments are particularly related to deep convolutional neural networks used for image tagging.

DETAILED DESCRIPTION

Figure 1:
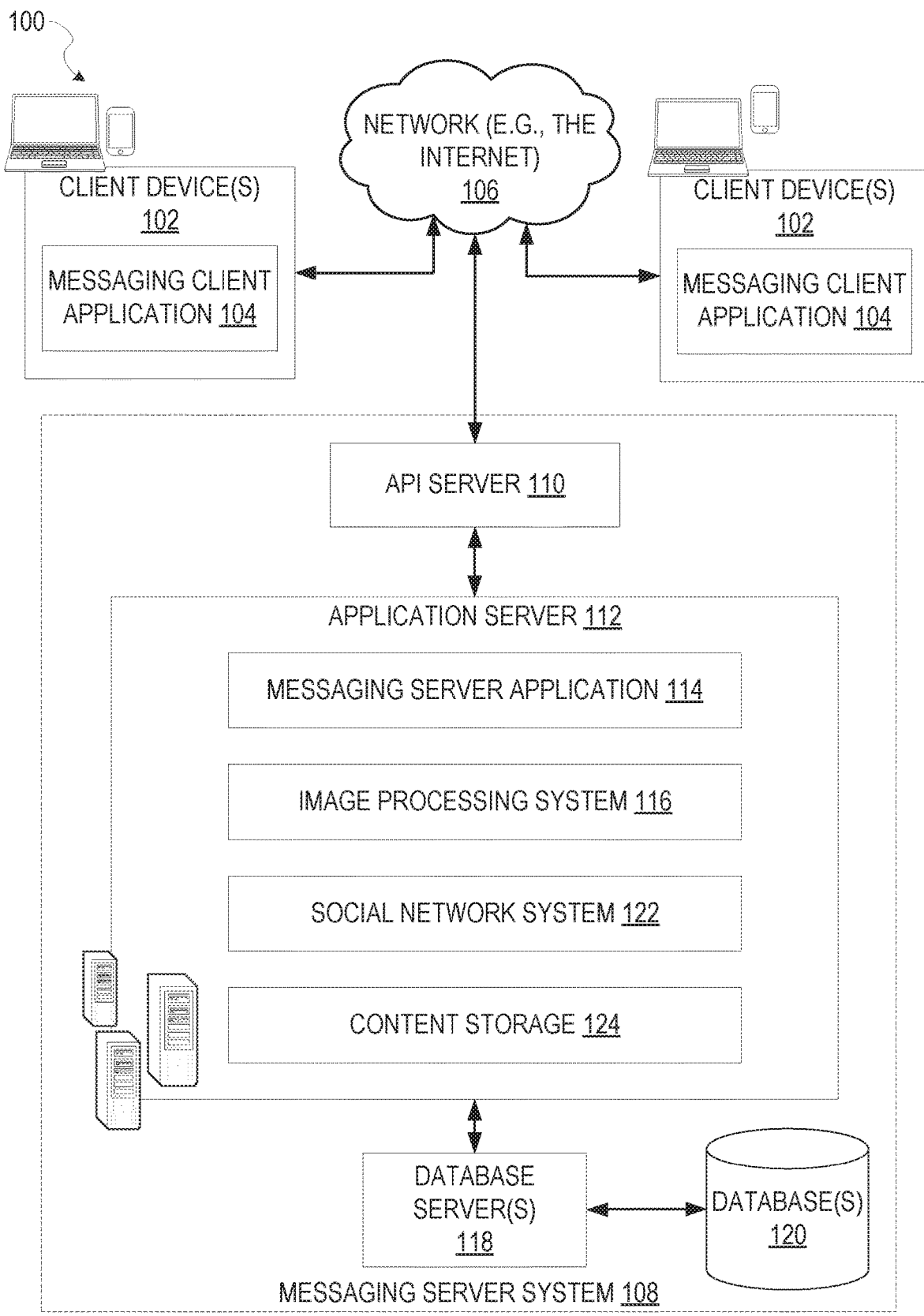
FIG. 1 is a block diagram showing an example messaging system for exchanging data (e.g., messages and associated content) over a network in accordance with some embodiments.

Embodiments described herein relate to resource limited computing systems and image processing to tag or label content for visual search on such resource limited computing systems. Various embodiments use such processing and labeling to automatically perform operations based on the resulting labels. For example, some embodiments use labels to enable searching of images on a device based on the labels associated with the images. Other embodiments use the labels to classify images for ephemeral or non-ephemeral storage processes in conjunction with user or system preferences. Some embodiments are particularly related to deep convolutional neural networks used for image tagging to enable visual search. Some embodiments operate in an ephemeral messaging system with an integrated content storage system for optional non-ephemeral storage of content.

Visual search refers to systems that allow users to input text in order to identify images associated with the text. For example, a text input of "beach" would result in a visual search result of images including a beach in at least a portion of the images. Traditional operations for enabling such visual search include significant computing resources to analyze images to generate "tags" or text metadata associated with an image based on object recognition or other analysis tools to identify the content of the image. Because of such resource demands, network-enabled mobile devices (e.g., smartphones or tablets) typically transfer some or all of the image processing to networked cloud computing resources. Such cloud-based techniques, however, have multiple drawbacks. These include difficulty in scaling and costs for computational and memory resources, particularly in an environment serving millions of users. Additionally, network resources to transfer images are also costly. Further still, transferring images over a network involves privacy concerns, where users may prefer not to generate and store copies of their images in a cloud environment.

Embodiments described herein provide technical solutions to the technical resource limitation problems presented above with particular processor-implemented object recognition operations. The embodiments described herein allow the mobile device to process and tag images on the mobile device under resource constrained conditions in a way not possible with previously known systems. In addition to enabling object recognition on mobile devices, additional benefits are provided by making content easily searchable in environments without network access, and by providing security and privacy by allowing search without making content accessible to a network. Thus, as described below, the embodiments improve the operation of mobile devices by enabling local tagging and visual search. Particular embodiments provide this improvement using deep convolutional neural networks (DCNN), knowledge graph(s), natural language processing, content metadata, or various combinations of the above.

Further, particular embodiments use the results of mobile device tagging to make autosave determinations for content. For example, a mobile device may have default operations to treat images or video-clips captured by an application of the mobile device as ephemeral (e.g., associated with a deletion trigger or other limited duration storage), but a user input or system setting may determine that "birthday" images should be identified as non-ephemeral and stored as non-ephemeral (e.g., stored in memory indefinitely without a deletion trigger until a specific command to delete the content is received). Labels and tagging described herein may be used to categorize certain images or videos as "birthday" images, with a resulting storage of these images in a non-ephemeral format separate from other content. Further, such content is then available for searching using terms like "birthday". "cake", "candles" and other such terms identifying the tagged images as part of local smart search operations on a device.

"Content", as described herein, refers to one or more images or video clips captured by an electronic device, as well as any associated metadata descriptions and graphics or animation added to the image or video clip. This includes metadata generated by an electronic device capturing an image or video, as well as metadata that may be associated later by other devices. A "piece of content" refers to an individual image or video clip captured by a client device with any changes made to the image or video clip (e.g., transformations, filters, added text, etc.). Individual pieces of content may have multimedia elements, including drawings, text, animations, emoji, or other such elements added along with image or video clip elements. Content captured by an image sensor of a client device may be sent, along with any added multimedia elements from a user, via a network to other client devices as part of a social sharing network. In various embodiments, content is stored as data in various memory structures of devices, and communicated via networks. Image data that is part of content for a picture or a frame of a video clip is considered content as described herein. Individual pieces of content (e.g., images, video clips or frames, etc.) may have time limits or associated display times that are within a display threshold set by a system. For example, an embodiment system may limit video clips to 10 seconds or fewer, and may allow users to select display times of fewer than 10 seconds for image content.

A "content message" as referred to herein refers to the communication of content between one or more users via the system. Content may also be sent from a client device to a server system to be shared generally with other system users. Some embodiments limit content messages to images or video clips captured using an interface that does not allow the content to be stored and sent later, but instead uses an associated content message with a single piece of content and any added multimedia to be sent before any other action is taken on the device. Embodiments described herein relate to methods of grouping such content into content collections (e.g., stories). In various systems, content messages may be sent from one individual user to another individual user, as, for example, an ephemeral message in addition to the ability to send content messages to a server computer system for inclusion in various content collections.

A "content collection" as described herein is an ordered set of content (e.g., a story). The individual pieces of content that make up a particular content collection may be related in a variety of different ways. For example, in some embodiments, a content collection includes all pieces of content marked as public that are sent to a server system from a particular user within a certain time frame (e.g., within the past 24 hours, the past week, etc.). Access to such a content collection can be limited to certain other users (e.g., friends or associated accounts in a communication system) identified by the user that generates the content for the collection. In some other embodiments, content collections include pieces of content from different users that are related by time, location, content, or other metadata. In some embodiments, content collections are referred to as stories. A story or content collection may be generated from pieces of content that are related in a variety of different ways, as is described in more detail throughout this document.

"Ephemeral" content refers to content with an associated trigger for deletion. In some embodiments, for example, a content capture interface (e.g., such as the interface illustrated in FIG. 8) enables the capture of images or video clips. An ephemeral messaging interface allows for the captured content to be communicated to other users as part of an ephemeral message that will be deleted after viewing, or to be sent to a "live" content collection that is available for viewing by other accounts in the system for a limited period of time. The ephemeral content is not stored on the device that captured the content unless a user elects to store the content. The application for the ephemeral messaging system thus defaults to deletion of the content unless the user elects to store the content in local application storage. "Non-ephemeral" content, by contrast, is content without an associated deletion trigger. In various systems described herein, different storage systems may be used for ephemeral and non-ephemeral content. For example, non-ephemeral content may be stored in a camera roll storage structure of non-volatile memory of a mobile device, while local ephemeral storage may be associated with a messaging application as part of memory dedicated to the messaging application operations. Such local ephemeral storage may be volatile memory or non-volatile storage memory dedicated to temporary storage of ephemeral content.

Thus, as described herein, some embodiments include the operations of an ephemeral messaging application operating on a client device (e.g., a smartphone) as part of an ephemeral messaging system that includes an operation for non-ephemeral storage of content. Various embodiments therefore include local tagging and search on a device for images captured by the device, as well as similar tagging and search for non-ephemeral images received through a messaging application.

FIG. 1 is a block diagram showing an example messaging system 100 for exchanging data (e.g., messages and associated content) over a network. The messaging system 100 includes multiple client devices 102, each of which hosts a number of applications including an ephemeral messaging client application 104. Each messaging client application 104 is communicatively coupled to other instances of the messaging client application 104 and a messaging server system 108 via a network 106 (e.g., the Internet).

Ephemeral messaging client application 104 operates as described below to enable communication of ephemeral content messages between devices associated with user accounts. In embodiments described herein, ephemeral messaging client application 104 also enables indexing and storage of content initially generated for ephemeral messaging in both a non-private format that is synchronized with content storage 124 on a server, as well as private content that may or may not be synchronized with content storage 124 depending on the level of security selected by a user of a client device 102.

In addition to content stored on a client device 102 using application 104, content may also be stored using an application directly associated with the camera on the device (e.g., camera roll storage) that is separate from the storage for application 104.

As part of operation of an ephemeral messaging client application 104, various tabs or user interface screens are available. One such screen is a content collection (e.g., stories) screen that includes icons for various stories, including a live story (e.g., "my story") for a user account of the specific client device; stories for content sources such as magazines, newspapers, television networks, etc.; stories for locations such as particular cities, universities, etc.; and stories for related accounts that are available to the account associated with the device displaying the interface (e.g., stories from friends).

Additionally, a user interface for content within application 104 includes a display for content stored within application 104. This may include a tab for all content, a separate tab for individual images and videos, and a tab for content collection. In some embodiments, such a user interface may present an individual presentation for a story which represents a number of images and/or videos. One embodiment uses a circular shape with at least a portion of an image from a piece of content displayed within the circle. The piece of content represented within the circle may change over time, such that each piece of content associated with a content collection is presented for a period of time. In one embodiment, part of an image from each piece of content is presented for one second, cycling through each piece of content in order and returning to the beginning after each piece of content in the story has been represented. For example, in a content collection with 15 pieces of content including images and videos, each piece of content has an associated image portion displayed within the circle for 1 second, with the pattern repeating after 15 seconds. On a device with multiple content collections, multiple such circles with rotating internal image content are displayed simultaneously within the interface on a device 102. In an "all" display, pieces of content may be displayed within rectangular areas next to circular areas for stories. This may involve various patterns of circles and squares as described herein.

When an image or video is captured using a content capture interface of application 104, the content can be sent as an ephemeral content message to another user or a server-based content collection and deleted from client device 102, or alternatively the content can be stored within the application storage of application 104. If the content is communicated directly to a live content collection, the live content collection simply presents each received piece of content in the order received as part of the user's content collection as it is shared with other users. In some embodiments, however, content may be sent to a user's live content collection after it is stored in application storage.

In one such embodiment, where the live content collection includes content for the last 24-hours, when content is sent from application storage to the live content collection, the content from application storage is ordered within the live content collection based on the time the piece of content was captured. It is then removed from the live content collection 24-hours after the content was generated, regardless of when it was added to the live content collection. In such an embodiment, if a piece of content from application storage is communicated to a live content collection more than 24 hours after the piece of content was generated, the piece of content is processed and adjusted to add a frame or overlay filter indicating when the piece of content was created, and is added to the live content collection when it is sent to the content collection. For a live content collection with content from 24 hours, the content from application storage is removed 24 hours after it is sent to the live content collection. In other embodiments, any other such triggers for automatic removal of content from a particular content collection can be used based on system settings.

In some embodiments, pieces of content sent to a user's "live" content collection are automatically stored within a content collection in application storage on the client device 102 and synchronized with content storage 124 on the server as associated with the user's account. In some embodiments, this is a system setting for all users, and in some embodiments, this is a user-selectable setting. In some embodiments, the content collection(s) in application storage are segmented in different ways. In one embodiment, a content collection continues having content added indefinitely as long as a set of content parameters are met. In one embodiment, for example, as long as content is added within 24 hours of the most recent update to a content collection, the same content collection is used. If a new piece of content is sent to a live content collection after 24 hours, a new content collection is started in local application storage. In other embodiments, a device lockout timer may be used (e.g., more than 1 hour since application 104 has been active).

Other embodiments may use device sensor data such as light sensors, accelerometer or gyroscope sensors, or any other such sensor data to initiate a new content collection based on threshold conditions. For example, one embodiment attempts to initiate a new content collection when a device user is asleep based on clock data, sensor data, and application usage data. One embodiment initiates a new content collection for content sent to a "live" content collection at the same time every day (e.g., 4 AM device time). In some embodiments, location and even data can be used to initiate a new content collection. For example, a device may have geofence data associated with a sports arena, and can initiate a new content collection when a user enters the geofence and end the content collection when the user leaves the geofence associated with the sports arena. In other embodiments, any other such triggers can be used to segment content collections within application storage.

As individual pieces of content are stored within the application storage, the user interface allows these individual pieces of content to be accessed and used to generate content collections within application 104. This may involve automatic ordering based on a generation time for each piece of content, or any user-selected ordering. Individual pieces of content and content collections can then be presented together or separately in the user interface of application 104.

As individual pieces of content are stored within the application storage, the user interface allows these individual pieces of content to be accessed within application 104. This may involve automatic ordering based on a generation time for each piece of content, or any user-selected ordering. Individual pieces of content and content collections can then be presented together or separately in the user interface of application 104. As described below, image tagging operations may be performed by the mobile device on such content to enable visual searching of content collections or of any content within the application storage using the various embodiments described herein. This image tagging is performed on the mobile device without transferring images to networked resources to assist with the image processing.

Additionally, in some embodiments, the separate camera roll storage may be accessed or presented within application 104. In some embodiments, application 104 accesses separate storage of the client device 102 to identify content, and presents the content within the camera roll storage within a portion of the application 104 interface. In some embodiments, this camera roll storage is not synchronized with content storage 124. Content that is moved or copied from camera roll storage to application storage is synchronized and backed up to content storage 124. If content from camera roll storage is used for a content collection or is marked "private" within application 104, the content is automatically moved to application storage. Depending on privacy settings, the content may be encrypted and/or deleted from camera roll storage after it is placed in application 104 storage. Such content may be automatically processed to generate tags and to make the content available for visual search within the application as it is moved from camera roll storage to application storage.

When content is generated using the content capture interface of application 104, metadata is stored with the content, such as capture time, capture location, available filters/overlays, temperature, device speed, user added drawings, or other such system-based metadata. In some embodiments, this information and the availability of certain overlay filters is stored, and the content is editable within application storage based on this metadata. For example, if application 104 allows ephemeral content to be edited to add an overlay filter for a location only when the client device 102 is within the location, then in some embodiments, this limited location overlay filter is still available for the content captured in that location even after the device 102 moves to a different location. The content stored in application storage may then later be communicated using a chat or messaging interface using special filters based on metadata. The ability to edit content from application storage to add overlays or drawings and then communicate the content applies both to individual pieces of content as well as entire content collections. Such metadata may be used with image tags to enhance visual search as described below.

For content stored in camera roll storage, some metadata may be accessed by the application 104 and similarly used to apply some filters to the content. Application 104 allows temporary editing and drawing on top of content from camera roll storage. In some embodiments, a user may selectively overwrite the camera roll file with edits. In other embodiments, the application 104 does not overwrite camera roll content with versions of the content including filters or overlay drawings, but makes a local copy in application storage. If the user does not store copies of camera roll content with added overlays within application storage or camera roll storage, the additions are lost when the user closes application 104 or navigates away from the camera roll content with added overlays.

As described below, various metadata and object recognition processing is applied to content in some embodiments. This enables searching and sorting of content within application storage. Text searching can be used to identify content based on metadata such as location name, content of images, context information from images, or any other such information (e.g., "Ho" may identify images associated with Houston Tex. and "home" as identified by metadata and object recognition data). In some embodiments, this searching is used to present one or more interfaces with dynamically sorted content. One example embodiment includes user interfaces for content that was generated near a current location of the device presenting the interface. Another example embodiment includes a "flashback" interface that displays content associated with a related day or time (e.g., the same day or week of a previous year or a previous instance of a current event that is associated with a current time/location of the client device 102). Similarly, more complex search and sorting associations can be generated. For example, certain times (e.g., days of the week) can be associated with presenting certain image content. In one embodiment, Friday afternoons can be associated with images of the beach, so that a search category of beach images is presented to a user only on Fridays after noon, or the search category is ranked and presented higher on Fridays after noon. In some embodiments, a server controlled system is used to select search categories based on server-selected criteria. For example, public news trends can be used to select certain search criteria which is then used to present certain groupings of local content from application storage. In one example, an Olympic victory in a certain event for a certain country may initiate a server-side command for devices within the associated country to prioritize local search groups associated with that event. As described herein, however, while search categories may be managed by a server system, the image tagging used to generate local results is performed on the mobile device.

In some embodiments, application storage is divided into non-private content and private content. In such embodiments, non-private content is not encrypted and is synchronized with content storage 124 on a server and presented within user interfaces of application 104 with no security. Application storage content marked as private can be managed in different ways. In some embodiments, such content is encrypted, and is only displayed within the user interfaces of application 104 after a password is entered into application 104. In one embodiment, such a password is a 4-digit numerical personal identification number (PIN). In another embodiment, a 16-character passphrase is used for greater encryption. In some such embodiments, a user is notified that the server system does not store passphrases and the user will lose all access to private content if a passphrase is forgotten. In some embodiments, private content is encrypted at the client device 102, with encrypted copies of the content synchronized to the content storage 124 within a server system, such that the content can be accessed at other devices associated with a shared account using the PIN or passphrase. In other embodiments, private content is stored locally with no copy stored within server-based content storage 124. In some embodiments, private content is shareable via messaging or chat interfaces after a PIN or passphrase is entered. In some embodiments, private content is not shareable.

Application 104 operates, as described herein, as part of an ephemeral messaging system (e.g., the messaging system 100). Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. Visual tagging operations as described for various embodiments below are, however, performed on the mobile device for reasons described above.

The messaging server system 108 supports various services and operations that are provided to the messaging client application 104. Such operations include transmitting data to, receiving data from, and processing data generated by the messaging client application 104. In some embodiments, this data includes message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server(s) 118, which facilitates access to a database(s) 120 in which is stored data associated with messages processed by the application server 112.

Dealing specifically with the Application Program Interface (API) server 110, this server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration; login functionality; the sending of messages via the application server 112 from a particular messaging client application 104 to another messaging client application 104; the sending of media files (e.g., images or video) from a messaging client application 104 to the messaging server application 114, and for possible access by another messaging client application 104; the setting of a collection of media data (e.g., content collection); the retrieval of a list of friends of a user of a client device 102; the retrieval of such collections; the retrieval of messages and content; the adding and deletion of friends to a social graph; the location of friends within a social graph; opening an application event (e.g., relating to the messaging client application 104).

The application server 112 hosts a number of applications and subsystems, including a messaging server application 114, an image processing system 116, a social network system 122, and content storage 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 (shown in FIG. 3) within the database(s) 120. Examples of functions and services supported by the social network system 122 include the identification of other users of the messaging system 100 with which a particular user has relationships or is "following," and also the identification of other entities and interests of a particular user.

Content storage 124 interacts with local storage from client devices 102 to synchronize non-ephemeral, non-private content between multiple devices associated with a single user account, and to manage any communication of such content to devices of other accounts as part of a communication from one account to another account.

The application server 112 is communicatively coupled to a database server(s) 118, which facilitates access to a database(s) 120 in which is stored data associated with messages processed by the messaging server application 114.

Figure 2:
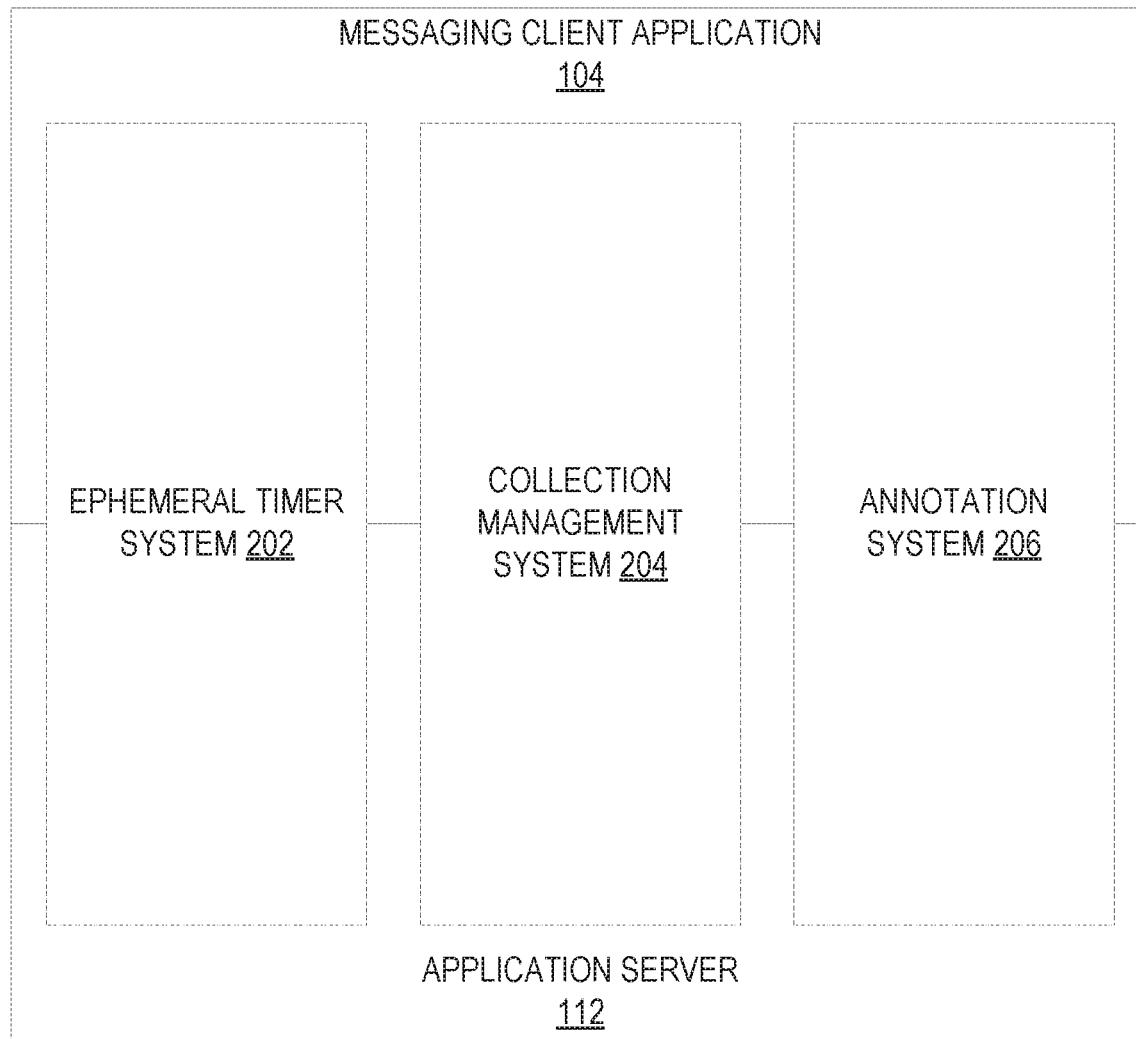
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT content collection), selectively display and enable access to messages and associated content via the messaging client application 104. Further details regarding the operation of the ephemeral timer system 202 are provided below.

The collection management system 204 is responsible for managing collections of media (e.g., collections of text, image video, and audio data). In some examples, a collection of content (e.g., messages, including images, video, text and audio) may be organized into an "event gallery" or an "event content collection." Such a collection may be made available for a specified time period, such as the duration of an event to which the content relates. For example, content relating to a music concert may be made available as a content collection for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database(s) 120 and accessed through the database server(s) 118.

In one example embodiment, the annotation system 206 provides a user-based publication platform that enables users to select a geolocation on a map and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time In various embodiments, visual search operations described herein may process both copies of images without added annotations, copies of images including annotations, or both depending on user selections and system settings.

Figure 3:
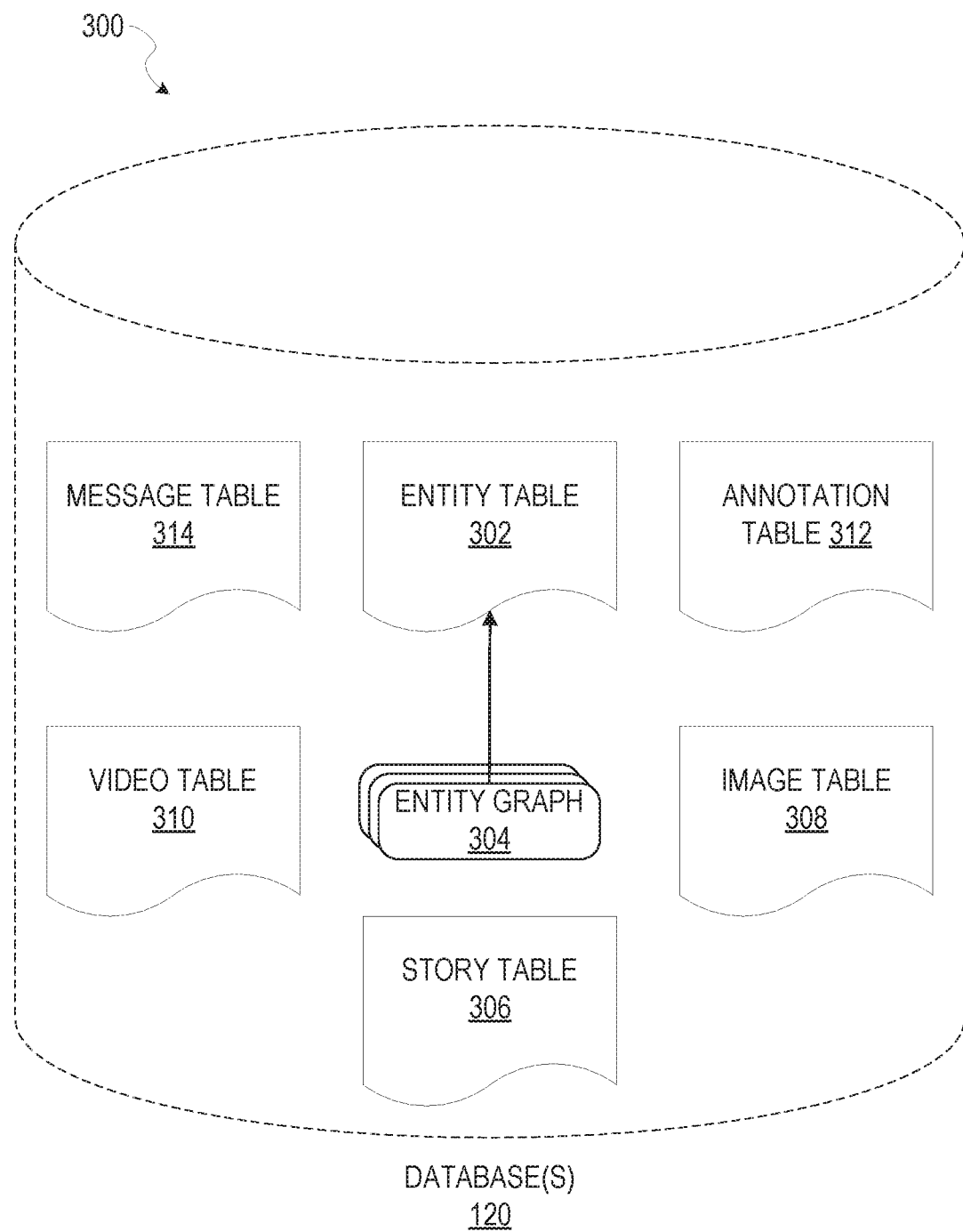
FIG. 3 is a schematic diagram illustrating data which may be stored in the database of the messaging system, according to certain example embodiments.

FIG. 3 is a schematic diagram illustrating data 300 which may be stored in the database(s) 120 of the messaging server system 108, according to certain example embodiments. While the content of the database(s) 120 is shown to comprise a number of tables, it will be appreciated that the data could be stored in other types of data structures (e.g., as an object-oriented database).

The database(s) 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interest-based or activity-based, merely for example.

The database(s) 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal content collection.

A collection may also constitute a "live story," or "live content collection," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a user interface of the messaging client application 104, to contribute content to a particular live content collection. The live content collection may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
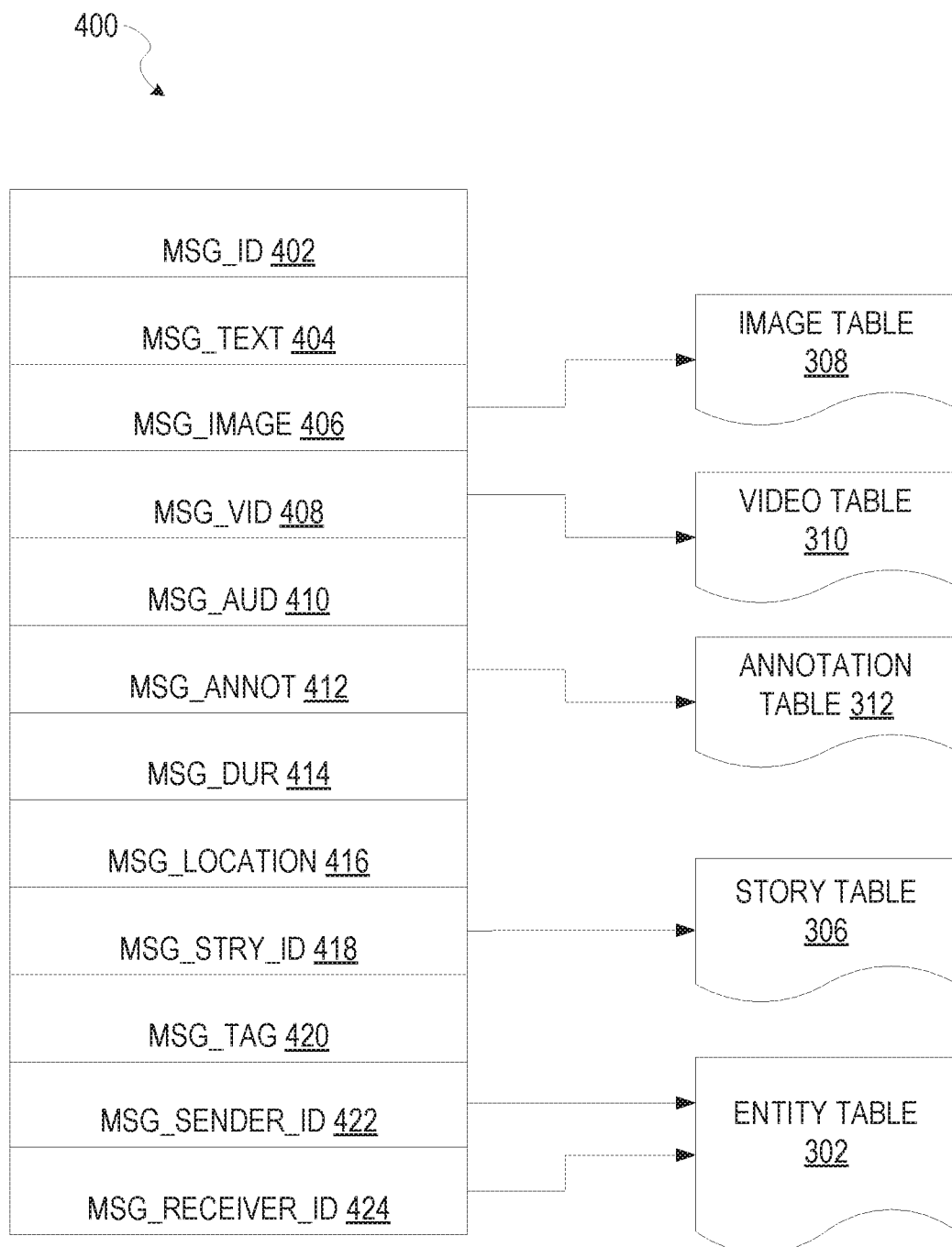
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database(s) 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

Message annotations 412: annotation data (e.g., filters, stickers or other enhancements) that represent annotations to be applied to message image payload 406, message video payload 408, or message audio payload 410 of the message 400.

A message duration parameter 414: parameter value indicating, in seconds, the amount of time for which content of the message 400 (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image within the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent.

A message receiver identifier 424: an identifier (e.g., a messaging system identifier, email address or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5A:
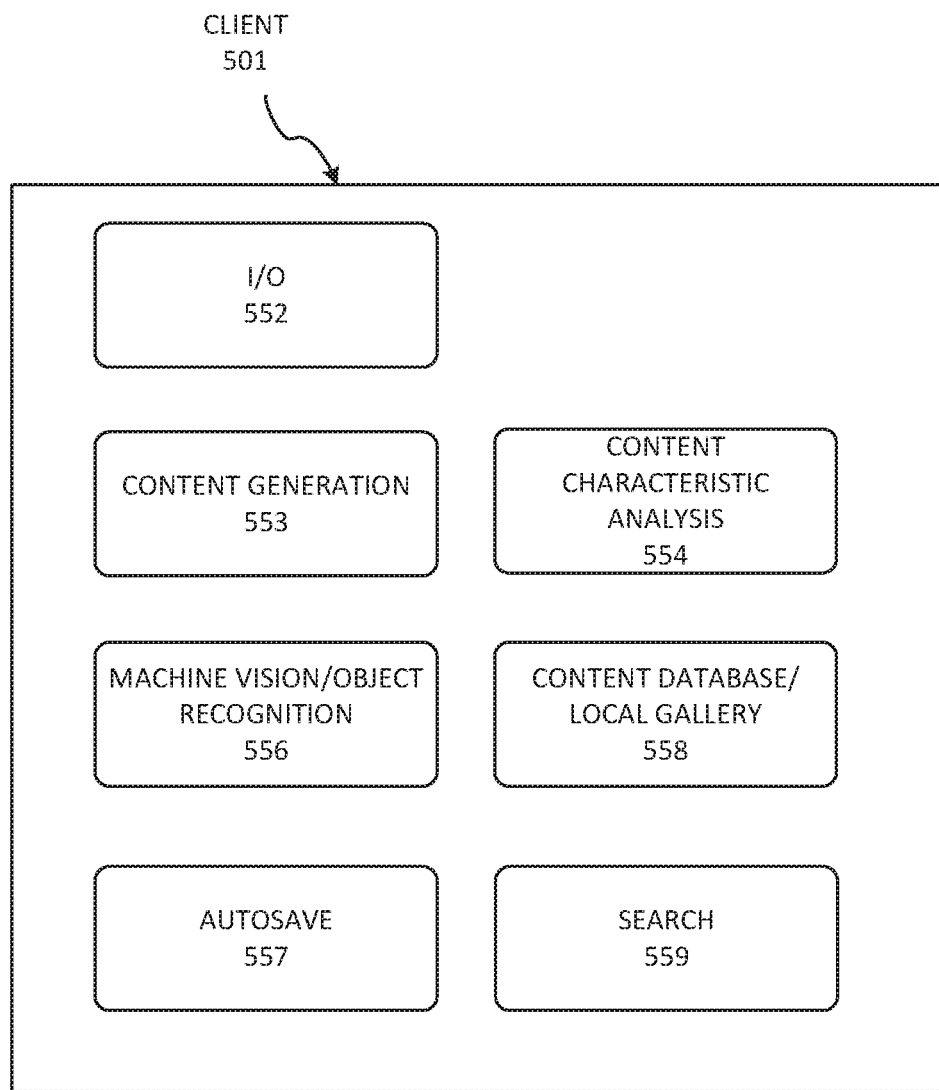
FIG. 5A illustrates aspects of systems and devices for image tagging, autosave analysis, and local visual search in accordance with some embodiments.

FIG. 5A illustrates aspects of a client 501 for local image tagging and visual search according to some example embodiments. In some embodiments, elements of client 501 described below are implemented as part of an ephemeral communication messaging application (e.g., application 104). In some embodiments, some aspects of client 501 are hardware elements such as image sensors, processors, and communication systems controlled by processors to implement content management and communication systems. The example client 501 includes input and output (I/O) module 552, content generation module 553, content characteristic analysis module 554, machine vision/object recognition module 556, content database/local gallery (referred to hereinafter as content database) 558, autosave module 557, and search module 559.

I/O module 552 may include any hardware, firmware, or software elements needed to send and receive content. In some embodiments this includes image sensors. In some embodiments this includes network interfaces for receiving images from other devices via a messaging network. The content generation module 553 includes devices and elements for generating, modifying, and accessing content. In some embodiments, aspects of I/O module 552 and content generation module 553 are part of the same module. In some embodiments, content generation module 553 includes aspects of an ephemeral messaging client application (e.g., application 104) used to manage capture and modification of images and video clips. Such modifications may include filters or overlays that modify images based on user inputs (e.g., text and drawing overlays), geofilters, augmented reality filters, image filters or transforms, addition of music or other audio, and any other such modifications. Content characteristic analysis module 554 may include devices, processors, and software to analyze images from pictures and frames of video clips, and then determine content characteristics, including details about when and where a picture or video was generated. Additionally, tags from object recognition module 556 may be used to associate characteristics with content. For example, sand and water may be associated with characteristics such as "beach", "water", "summer", etc. In certain embodiments, content characteristic analysis module 554 may be implemented as a plurality of different modules, each analyzing a different content characteristic, including any content characteristic described herein.

Object recognition module 556 describes a particular module that may be used to identify content characteristics based on the content of an image or images in a video. Object recognition module 556 includes hardware, firmware, and/or software for analyzing and understanding content. In one embodiment, object recognition module 556 is associated with a dictionary comprising image and video content values. Objects identified in images of a piece of content and the arrangement of the identified objects therein may be used by object recognition module 556, in such an embodiment, to select one or more content values from the dictionary as content characteristics. For example, a simple object recognition module 556 may identify a ball in an image, and select the values "ball" and "game" as content characteristics. A more complex module may identify the type of ball as a basketball, and include "basketball" as a characteristic value. A still more complex object recognition module 556 may identify a basketball, a crowd, a court color, and an elevated perspective of the court to identify "professional basketball game" and "basketball arena" as content values for the content. The same complex object recognition module 556 may identify a basketball, a park background, and a concrete court surface and associate "amateur basketball game" and "playground basketball" as content values for the content that is illustrated as an example in FIG. 6A. Such content values may operate as context data which are used to generate content collections as described herein.

However, besides such content values, other types of content values may be used to generate content collections without using content values, or in addition to such content values. For example, one embodiment of an image may have associated context data comprising location data (e.g., coordinates or a geofence), time data (e.g., a time of day, a day of the month, an hour, etc.) content values (e.g., trees, basketball court, a face, etc.) quality values (e.g., blur, exposure, brightness, contrast, etc.) or any other such values which are referred to herein as context data.

These content values generated by the object recognition module 556 can then be stored in the content database 558 along with other characteristic values. Such characteristic values can include: one or more content values (i.e., an identification of what's in the content); a generation time; a generation time period; a generation location; a generation area; one or more quality values; any metadata value associated with content; an identifier for a particular piece of content; or any other such values. In some embodiments, a copy of content may be stored in the content database 558 with location information, capture time information, and any other such information about a piece of content. In certain embodiments, the content database 558 may anonymously store details about content use. For example, client devices 102 can communicate details about presentation of the content on a screen of the device, and about screenshots taken of the content. Anonymous metrics about how often a piece of content is viewed as part of a content collection, how long the content is viewed for, and how frequently screenshots are taken may then be measured by client 501, as part of analysis by content characteristic analysis module 554, with the resulting data stored in the content database 558. In some embodiments, the content database 558 may include this content information with any content or content message information discussed above with respect to FIG. 4 or in any database or table structure discussed above.

Autosave module 557 uses the information from the above modules to make determinations about how to manage the storage of content. As described above, various operations may be performed to determine when content at client 501 is to be stored as non-ephemeral data or as ephemeral data. In some embodiments, client 501 defaults to considering content as ephemeral, and an analysis by autosave module 557 using information from modules 554, 556, and 558 is used to determine when to create a special case to store content in non-ephemeral storage. In some embodiments, additional user interface options are also available to allow a user to select non-ephemeral storage options, or to select analysis parameters for autosave module 557 to store content as non-ephemeral data. Such parameters may include messaging history, content tags identified as having non-ephemeral preferences, and information about other non-ephemeral content stored on client 501. Additionally, in some embodiments autosave module 557 may perform similar content analysis to identify content as private or non-private. As described above, private content may be stored separately from non-private content, and may include additional storage operations or structures, such as encryption. Ephemeral and non-ephemeral content can both be identified as private or non-private. Non-private non-ephemeral content may, for example, be stored in a local camera roll storage and scheduled for backup on a remote storage network. Private non-ephemeral content may be stored in local camera roll storage with encryption, password protection, and no network backup, or any such combination. Ephemeral content may be treated similarly within a local application storage, and may additionally have different deletion triggers for private and non-private ephemeral messages.

Search module 559 similarly uses information from any of the above modules to provide search information about content. In some embodiments, search of ephemeral and non-ephemeral data is managed differently. For example, ephemeral content may not be indexed for search in content database 558. In other embodiments, all content, including ephemeral content, is indexed and made available for search results on client 501. In some such embodiments, all details of ephemeral content is removed from client 501 when the ephemeral trigger is met and the content is deleted. In other embodiments, some search information is retained, along with details of the deletion trigger, after the associated content is deleted, and the information (e.g., categories, deletion time, etc.) is still available for search. Additionally, private and non-private content may also be searched separately. In some embodiments, private content is not indexed for smart search, while in other embodiments, users may elect any content for inclusion in search indexing. Any search or sorting options described herein may be performed by search module 559, such as sorting based on geofilters, capture time, content, associated sensor data or other metadata, or any such information available on client 501 as described above.

While each of these modules are discussed separately, it will be understood that other embodiments may organize these elements in different ways. In some embodiments, for example, autosave module, search module, object recognition module 556, and content characteristic analysis module 554 may all be combined and store data in any number of ephemeral or non-ephemeral storage structures (e.g., camera roll storage or local application storage as described above) of client 501.

Figure 5B:
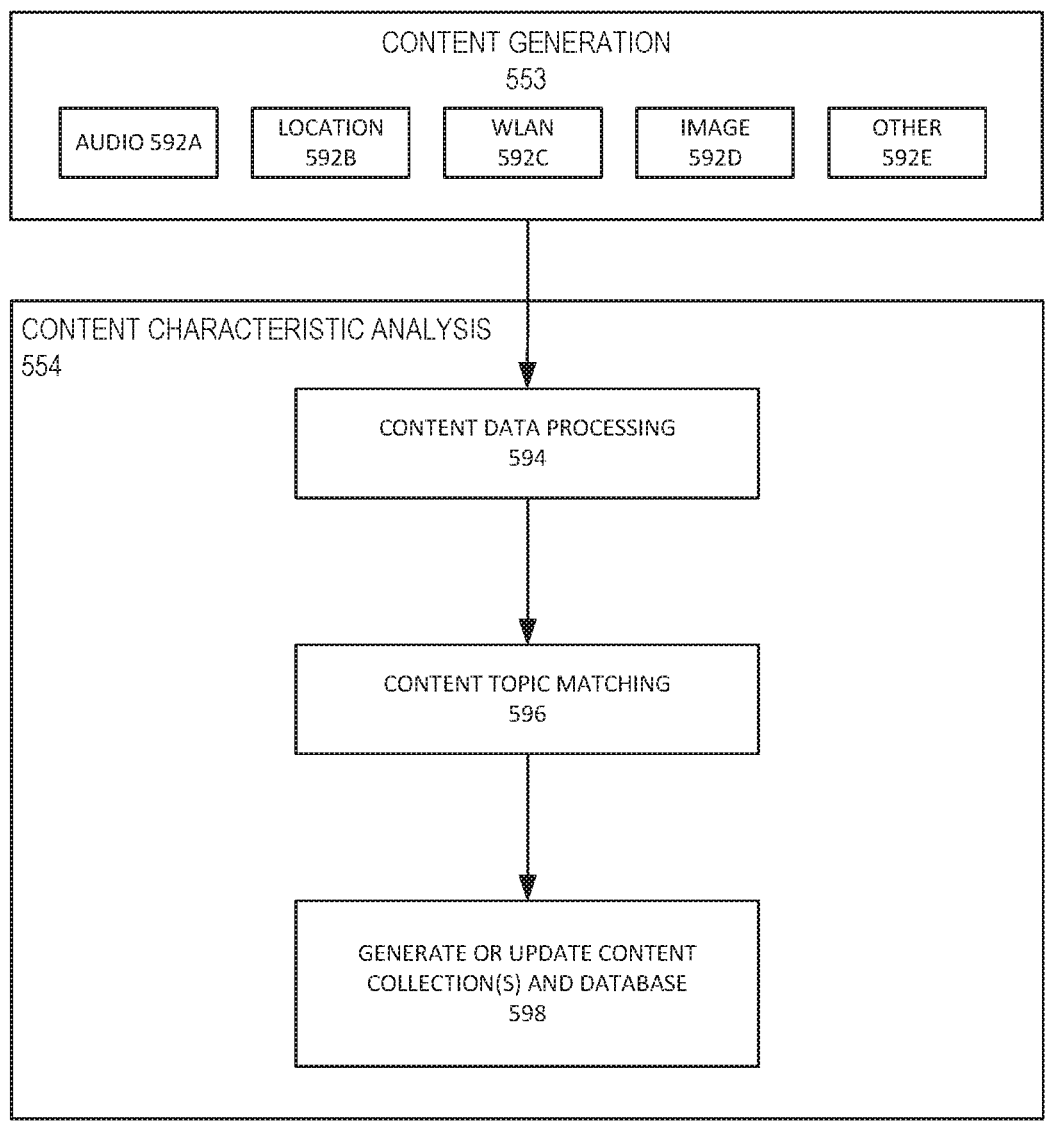
FIG. 5B illustrates aspects of systems and devices for image tagging, autosave analysis, and local visual search in accordance with some embodiments.

FIG. 5B illustrates aspects of systems and devices for image tagging, autosave analysis, and local visual search in accordance with some embodiments. FIG. 5B describes aspects of systems to curate content collections using image processing and image search, including an example embodiment of content generation module 553 and content characteristic analysis module 554. In module 553, content, such as the content for an image, is captured at a device. The content capture may involve creation of multiple different types of data, including audio data 592A, location data 592B, wireless local area network (WLAN) data 592C, image data 592D, or other data 592E. Audio data 592A may be any data recorded by a microphone at the device, and may include data from sound output by a speaker of the device module 592. Location data 592B may include any location data from a device, including network assisted location information, global positioning system (GPS) or global navigation satellite system (GNSS) data, accelerometer data, map data, or any other such data related to location and movement of the device performing the content generation.

Wireless LAN data 592C may include information about available wireless connections on any number of different wireless protocols, including Bluetooth signals, Near-Field Communication (NFC) signals, Wi-Fi signals operating according to Institute of Electrical and Electronic Engineering (IEEE) communication standards, or any other such signals. For example, in some environments, a business may offer a device access to an access point for network connectivity, with the access point having an identifier that describes the business. The identifier may be used as content metadata, and may be matched to the business name with an associated triggered action as described herein.

Image data 592D may be images, video clips, or other information from a camera within the device performing the content capture. Other data 592E may be any information generated by any sensor or I/O component of the device performing the content capture. Such data is then analyzed in any fashion described above, to generate scores and context values for the content. The resulting data is then formatted and stored within a system in module 594.

As content data and metadata are captured, it may be processed in a number of different ways, and may then be matched against system patterns or topics in the content characteristic analysis module 554. In some embodiments, for example, a system may have general topics which are used to generate search spaces for content curation. One system may, for example, sort content into "object," "life," "sports event," "music event." or "other" topics. Various systems may use any number of such topics or context sorting values. Some systems may include multiple tiers of topics or patterns, where context information is matched to system patterns that are used for content collections.

In some embodiments, this may be as simple as matching content metadata text against a stored text pattern. For example, if an identifier for an access point or a machine vision output includes the word "coffee" and the word "coffee" is a pattern in the system for matching, then a match is identified. Other matches of content data against system patterns may be more complex.

In some embodiments, image search using images from content generation module 553 is part of an analysis of content data performed to assist with content data processing 594. In other embodiments, however, image search and matching with existing content items may be performed automatically with content generation module 553. The image search operations may be used to enhance the pattern matching performed by a client device working with a server to implement image processing and curation as described herein. Image searching refers to systems which accept images as input, and output related information. In some embodiments, a matching score may be generated and used in any analysis process described herein. Such systems may also return either keyword information describing the information in the image, other similar images, or both. For example, an image search system may accept an image of a cat, and may provide the word "cat" as a response along with other images of similar cats. Some embodiments of image search may include other more detailed information, such as a breed of the cat, a color of the cat, or other detailed information about the environment of the image. Any image processing system described herein may use an independent image search system to process images, generate output information about the images from the search, and store this image search information as context data for a piece of content to be used with content curation.

In module 598, any match identified by module 596 may be used to generate or update a content collection, or to update information about a piece of content within the local content database. For example, in one embodiment, when a content collection is being generated based on a particular piece of content, after the content is matched to a topic in module 594, then all pieces of content within a search space (e.g., within a two-mile radius and a two-hour time range) are analyzed for similarity using image content (e.g., visual similarity), distance, time, or any other system criteria. If a sufficient number of pieces of content are identified, then a content collection is generated. In some embodiments, if not enough similar pieces of content are found, the criteria for the search space is expanded until sufficient content is identified to generate a collection. In other embodiments, rather than creating a collection, a search index or sorted organization of relevant content is generated for local presentation on a mobile device. In some embodiments, a server system may provide different search parameters associated with different events, in order to present content in an ordered way during an event period. For example, during the hours of a particular holiday, the server system may provide a default presentation order using sorted search or topic matching associated with the holiday. This may include, for example, snow, pine tree, and present-based search ordering for one holiday, and colored egg and rabbit-based search ordering for another holiday.

In some embodiments, the criteria within a search space (e.g., different quality or content values) are weighted differently within different topic categories. For example, "life" and "object" content may be matched to content within larger distances. "Object" content may have more strict visual content matching requirements, while "life" content may have more strict time requirements. "Sport event" or "Music event" may have specific time windows and visual match criteria associated with a specific event in a specific place, so that content from a specific event will be matched with content from the same event to generate a content collection for an individual event.

As described herein, such collections generated based on topic matching along with other content data matching may be performed automatically to generate a content collection using machine processing of content. In some embodiments, such an automatically generated content collection can be reviewed and edited after it is presented to some users. In some such embodiments, user feedback on particular pieces of content is used to adjust or update a content collection over time. For example, as new pieces of content are received, the matching process above may be performed, and pieces of content swapped out based on quality scores, user feedback, or any other such system information related to a content collection.

In various embodiments, operations may be performed for a plurality of content messages and for messages from multiple content sources. A content collection is thus, in some embodiments, generated from content sourced from a number of different client devices (e.g., content sources). In some embodiments, the analyzed content is reviewed by an operator of a curation tool prior to being added to a content collection. In other embodiments, the content may be reviewed by an operator of a curation tool after the content has been added to the content collection and transmitted to one or more system users. In some embodiments, user feedback from transmissions may be used to adjust scores and re-evaluate which pieces of content are in a content collection, or to flag pieces of content for review by a system operator.

Over time, as new pieces of content are received and analyzed by a system, new content may replace previous content as part of analysis and curation of a content collection. Thus, in some embodiments, the operations described above may occur many times for a single content collection, with previous content removed and new content added. In some situations, this is based on new content having higher quality or relevance scores. In some situations, content with lower quality or topic matching scores may be used in place of higher scoring content that is older.

In various embodiments, context information is structured differently, with any number of values for time, location, distance from a target, account information associated with a device that generated the content, audio content, complex "interestingness" scores, or any other such information used as context information. Similarly, any number of quality metrics such as brightness, contrast, saturation, blur, noise quality, audio speech clarity, or other values may be identified and analyzed as part of the image processing and content curation described herein.

In some embodiments, context information such as an "interestingness value" is generated using a neural network generated using a training set of content messages identified as interesting within the server computer system. In some embodiments, this involves the use of convolutional neural network with a feature map including a set of content features and a set of quality features. In other embodiments, data includes feedback messages from users rating selected content messages. Such ratings may be received after the content collection including the content messages has been sent to some users. Such ratings may also be part of any other access system where content is available to users.

Figure 5C:
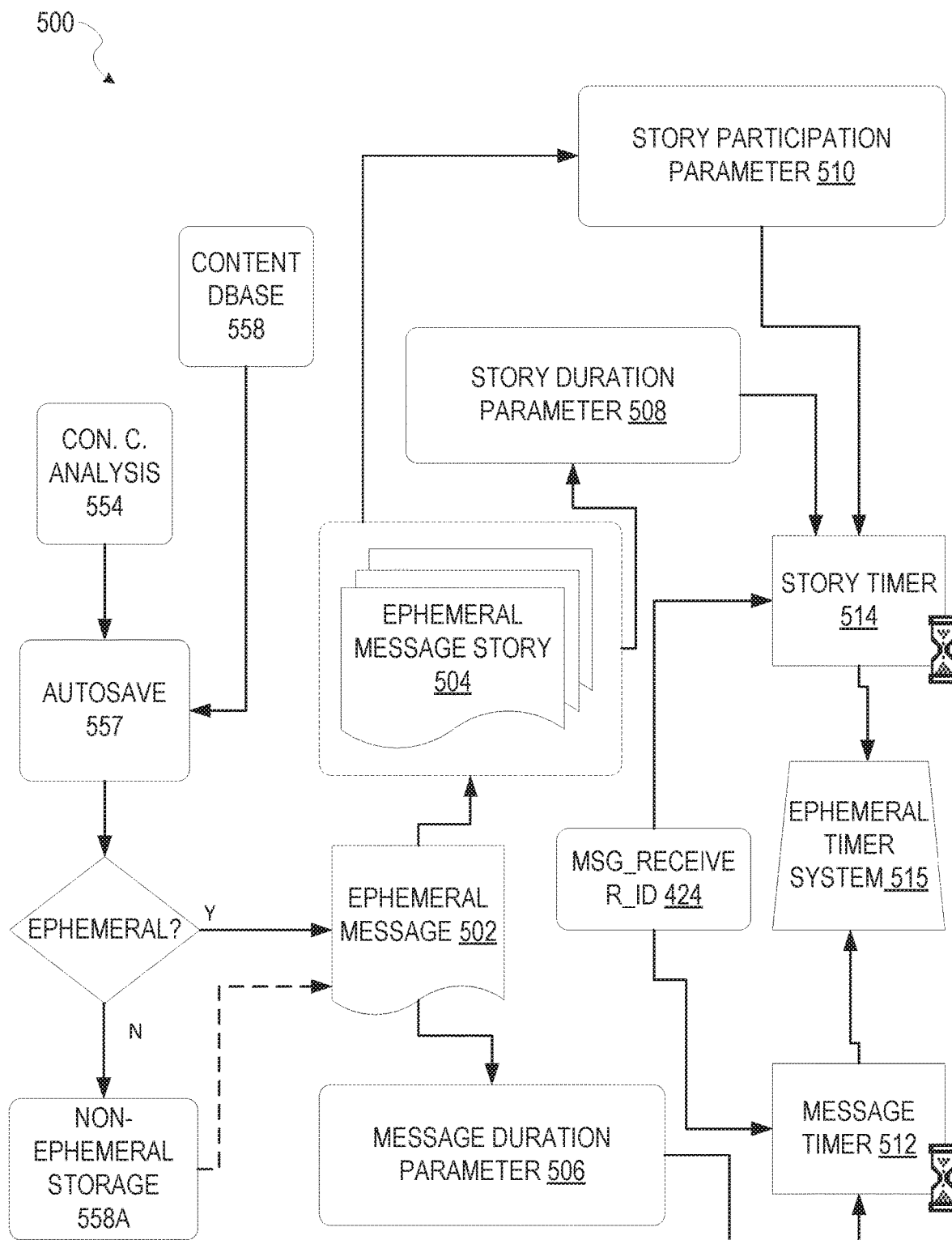
FIG. 5C illustrates aspects of systems and devices for image tagging, autosave analysis, and local visual search in accordance with some embodiments.

FIG. 5C illustrates aspects of systems and devices for autosave analysis which may be used with a system for image tagging and local visual search in accordance with some embodiments. FIG. 5C illustrates automatic autosave operations in a system with both ephemeral and non-ephemeral content storage. FIG. 5C thus also describes an access-limiting process 500, in terms of which access to content (e.g., an ephemeral message 502, and associated multimedia payload of data) or a content collection (e.g., an ephemeral message story 504) may be time-limited (e.g., made ephemeral).

As illustrated in the example embodiment of FIG. 5C, autosave module 557 receives information from content characteristic analysis module 554 and database 558. In some embodiments, content characteristic analysis module 554 generates data automatically in response to capture of the content being processed, while database 558 provides relevant history, system, and user preference information. This information is processed in autosave module 557 and a determination is made as to whether the analyzed content is ephemeral or not. If the content is identified as non-ephemeral, it is stored in non-ephemeral storage 558A (e.g., camera roll storage). It may later be imported or have a copy placed into the ephemeral messaging system for ephemeral local storage as part of messaging or content collection generation, as described below.

If the content is identified as ephemeral, then no permanent copy is saved in the non-ephemeral storage, and the image is processed for inclusion in an ephemeral message or story. An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 515, which is responsible for the overall timing of display of content (e.g., an ephemeral message 502) to a receiving user.

The ephemeral message 502 is shown in FIG. 5C to be included within an ephemeral message content collection 504 (e.g., a personal SNAPCHAT content collection, or an event content collection). The ephemeral message content collection 504 has an associated content collection duration parameter 508, a value of which determines a time-duration for which the ephemeral message content collection 504 is presented and accessible to users of the messaging system 100. The content collection duration parameter 508, for example, may be the duration of a music concert, where the ephemeral message content collection 504 is a collection of content pertaining to that concert. Alternatively, a user (either the owning user or a curator user) may specify the value for the content collection duration parameter 508 when performing the setup and creation of the ephemeral message content collection 504.

Additionally, each ephemeral message 502 within the ephemeral message content collection 504 has an associated content collection participation parameter 510, a value of which determines the duration of time for which the ephemeral message 502 will be accessible within the context of the ephemeral message content collection 504. Accordingly, a particular ephemeral message content collection 504 may "expire" and become inaccessible within the context of the ephemeral message content collection 504, prior to the ephemeral message content collection 504 itself expiring in terms of the content collection duration parameter 508. The content collection duration parameter 508, content collection participation parameter 510, and message receiver identifier 424 each provide input to a content collection timer 514, which operationally determines, firstly, whether a particular ephemeral message 502 of the ephemeral message content collection 504 will be displayed to a particular receiving user and, if so, for how long. Note that the ephemeral message content collection 504 is also aware of the identity of the particular receiving user as a result of the message receiver identifier 424.

Accordingly, the content collection timer 514 operationally controls the overall lifespan of an associated ephemeral message content collection 504, as well as an individual ephemeral message 502 included in the ephemeral message content collection 504. In one embodiment, each and every ephemeral message 502 within the ephemeral message content collection 504 remains viewable and accessible for a time-period specified by the content collection duration parameter 508. In a further embodiment, a certain ephemeral message 502 may expire, within the context of ephemeral message content collection 504, based on a content collection participation parameter 510. Note that a message duration parameter 506 may still determine the duration of time for which a particular ephemeral message 502 is displayed to a receiving user, even within the context of the ephemeral message content collection 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message content collection 504.

The ephemeral timer system 515 may furthermore operationally remove a particular ephemeral message 502 from the ephemeral message content collection 504 based on a determination that it has exceeded an associated content collection participation parameter 510. For example, when a sending user has established a content collection participation parameter 510 of 24 hours from posting, the ephemeral timer system 515 will remove the relevant ephemeral message 502 from the ephemeral message content collection 504 after the specified 24 hours. The ephemeral timer system 515 also operates to remove an ephemeral message content collection 504 either when the content collection participation parameter 510 for each and every ephemeral message 502 within the ephemeral message content collection 504 has expired, or when the ephemeral message content collection 504 itself has expired in terms of the content collection duration parameter 508.

In certain use cases, a creator of a particular ephemeral message content collection 504 may specify an indefinite content collection duration parameter 508. In this case, the expiration of the content collection participation parameter 510 for the last remaining ephemeral message 502 within the ephemeral message content collection 504 will determine when the ephemeral message content collection 504 itself expires. In this case, a new ephemeral message 502, added to the ephemeral message content collection 504, with a new content collection participation parameter 510, effectively extends the life of an ephemeral message content collection 504 to equal the value of the content collection participation parameter 510.

Responsive to the ephemeral timer system 515 determining that an ephemeral message content collection 504 has expired (e.g., is no longer accessible), the ephemeral timer system 515 communicates with the messaging system 100 (and, for example, specifically the messaging client application 104) to cause an indicium (e.g., an icon) associated with the relevant ephemeral message content collection 504 to no longer be displayed within a user interface of the messaging client application 104. Similarly, when the ephemeral timer system 515 determines that the message duration parameter 506 for a particular ephemeral message 502 has expired, the ephemeral timer system 515 causes the messaging client application 104 to no longer display an indicium (e.g., an icon or textual identification) associated with the ephemeral message 502.

Figure 6A:
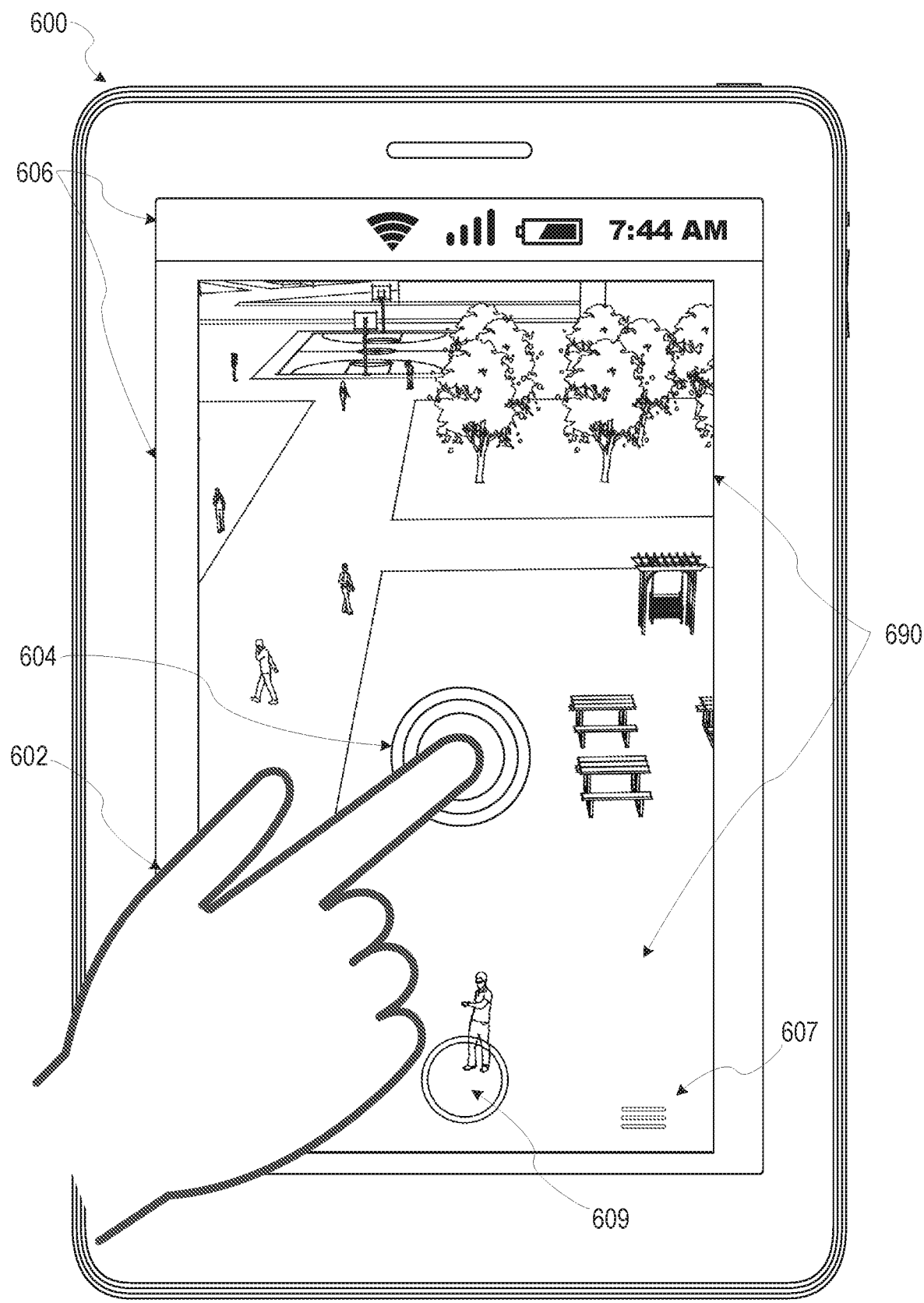
FIG. 6A illustrates aspects of a device for image tagging and visual search with some embodiments.

FIG. 6A shows aspects of a user interface for a message device 600 that may be used as part of a system as described herein. Message device 600, for example, may operate any elements of client 501 or client devices 102. FIG. 6A shows message device 600 with display area 606, which is a touch screen operating as both an output display and an input device. Device 600 may be used to capture content, which is then processed and analyzed according to embodiments described herein. The content illustrated in display area 606, for example, may be processed by the object recognition module 556 to identify a basketball, a park background, and a concrete court surface and associate "amateur basketball game" and "playground basketball" as context data for the content. Depending on other context data, such as location data, the context may be identified as "school" or "park" or "university".

In addition to various user interface elements, display area 606 displays image 690 (e.g., the image 690 for content generated by the device 600), which includes both image data from a camera of device 600 as well as image capture user interface elements. Interface element 607, for example, provides input options to send messages. Interface element 609 may be used to initiate capture of content (e.g., images or video clips) using the camera. Such content may then be analyzed locally as part of local organization or search within a gallery of content stored on the device 600 in accordance with the embodiments described herein. Operations via device 600 may be initiated by a user 602 provide a user input 604 via contact with the display area 606 for a touch screen input device.

Figure 6B:
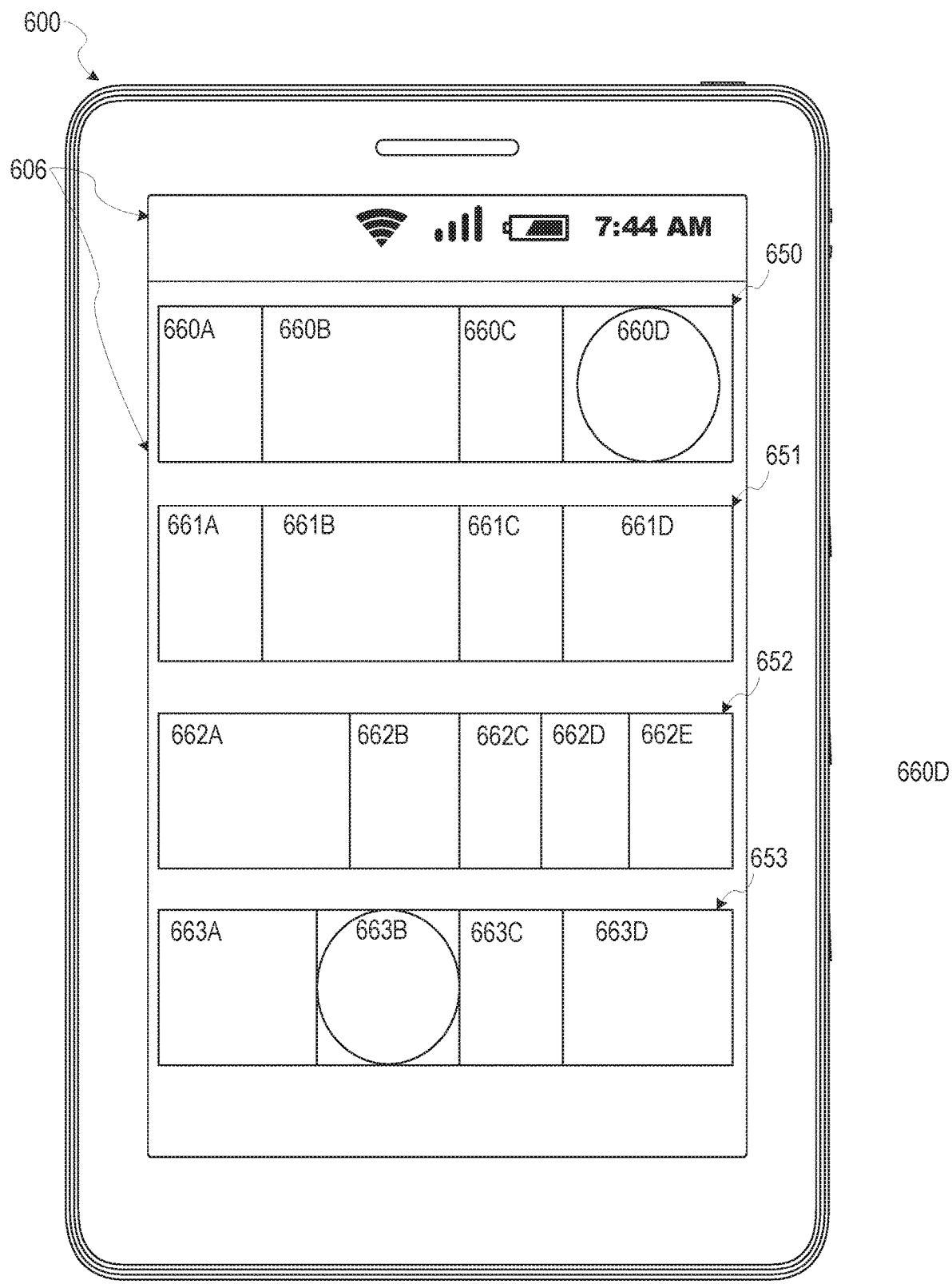
FIG. 6B illustrates aspects of a gallery view with multiple ordered presentations of content elements in accordance with some embodiments.

FIG. 6B then illustrates aspects of a gallery or gallery search view that may be used to present smart search result views of content captured and/or stored at a mobile device based on tagging performed at the mobile device. FIG. 6B illustrates display area 606 with a plurality of search result or header areas 650-653. Each of these areas is associated with a different set of search criteria, and may include a "header" describing the search criteria associated with the area. For example, area 650 may be associated with "flashback" or time based anniversary content elements which show images from a corresponding day or time a set period of time in the past (e.g. the same day on a different year, a different month, or within a threshold time period on a previous day). Area 651 may show content elements that were taken in a location within a threshold distance of a current location (e.g. as determined by location services or global positioning services) of a mobile device. Area 652 may show content elements tagged with identified object tags such as "food." Area 653 may show a general context tag generated from object tags such as "outdoors".

In the embodiment of FIG. 6B, each area includes a plurality of content display areas. Header area 650 includes content display areas 660A-D, header area 651 includes content display areas 661A-D, header area 652 includes content display areas 662A-E, and header area 653 includes content display areas 663A-D. These content display areas may be adjusted based on the number of search results, the type of search results, or user preferences. For example, image and video clip content elements may be placed in rectangular areas, with video clips played within the search area, while content collection results may be placed within a circular content display area. As described above for ephemeral messaging, each content element may have threshold display times, and the presentation may cycle in any number of ways to display additional search results if more results in a category associated with a particular header are present than the number of content display areas for the header. In some embodiments, a crossfade animation is used to cycle between the individual content elements (e.g. images, videos, or collections).

Further, as described herein, some systems may include both private and non-private storage of images. In some embodiments, a default presentation may include search results or presentations including only non-private images. Input of a code or PIN may be used to adjust search results to include private content elements.

The ordering of header areas may be set in different ways in different embodiments. In some embodiments, header/search ordering is based on user selections. In other embodiments, this ordering is adjusted by a system operator of a communication system, such that default presentation of header areas may be ordered in different ways at different times as selected by a communication system operator. In other embodiments, the search results impact the ordering of the header areas. In some embodiments, for example, a number of results for a search category is used to order the header areas, such that header areas with more results are presented first. Scrolling down below the area presented in display area 606 may presented additional header areas with fewer content elements in some embodiments. In other embodiments, a mixture of default ordering is presented with an initial number of header areas being fixed, and a lower set of header areas based on search results. In some embodiments, the initial fixed header areas are only presented if they include a threshold number of content elements. For example, a system may have a search order selected with a first header area for "taken nearby" content elements, a second header area for "flashback" anniversary content elements, and a third header area for "weekend night" time based content elements, with subsequent header areas based on the number of matches for any content elements within the local database. A portion of the "weekend night" content elements may be tagged as private and encrypted, such that they are only presented within the "weekend night" header area after a password or other privacy input is used.

Further, as described above, a "content element" may include a collection of content within a content display area. Thus, header area 653 may, in some embodiments, include one content element, where the content element is a content collection comprising a plurality of images and or video clips. In such an embodiment, the header area would include a single content display area, with content elements of the content collection presented in order. A search result match for the criteria of a header area may, in such embodiments, be based on a single image within the collection containing a matching term, such that a single image in a content collection associated primarily with "sports" may match "food" based on a single image matching both "sports" and "food". In other embodiments, different thresholds for matching content collections may be used.

Within any of the header areas of display area 606, selection of a particular content display area may be used to select a content element for communication in an ephemeral communication system as described herein.

Figure 7:
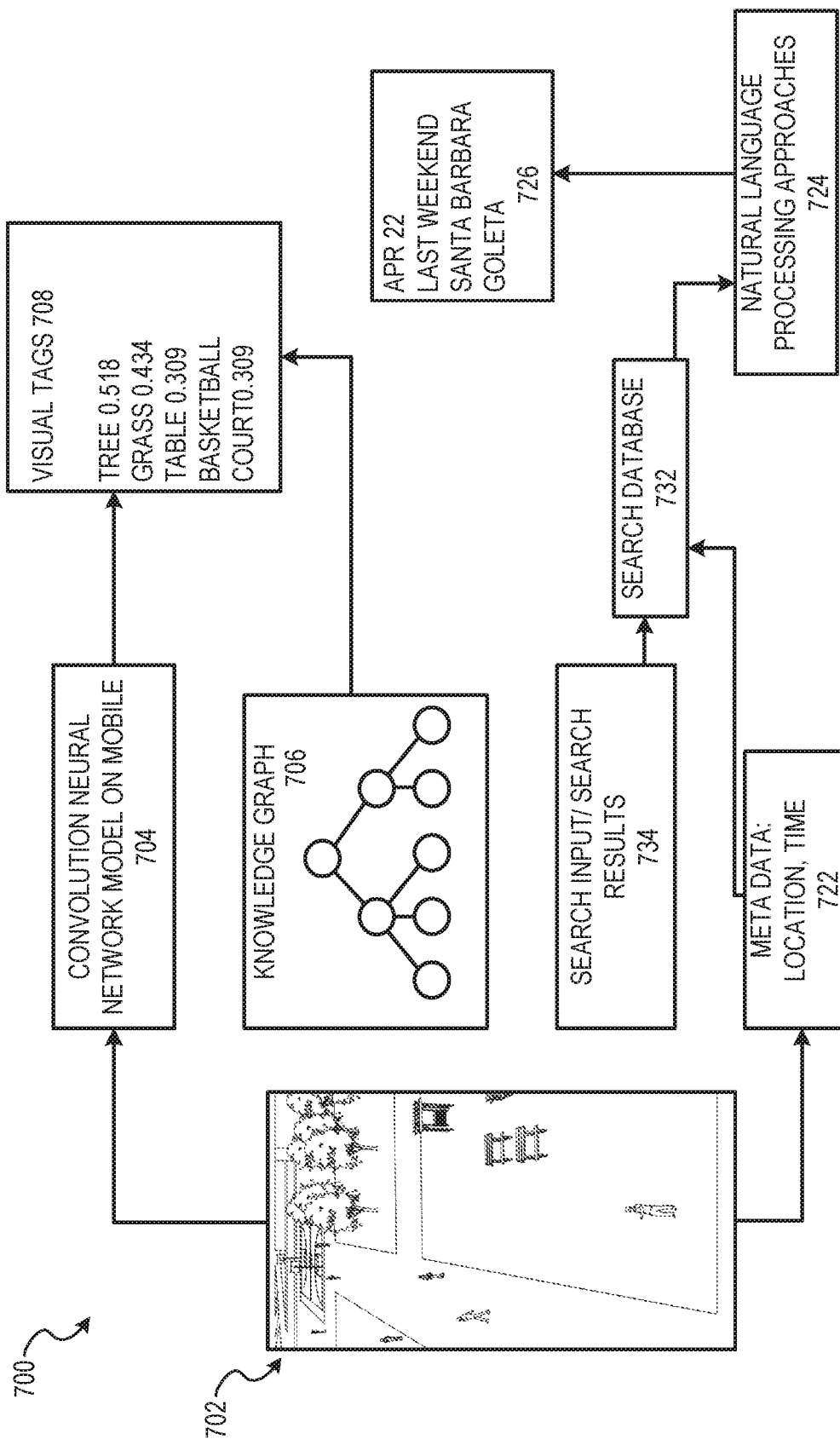
FIG. 7 illustrates aspects of a system for image tagging and visual search according to some embodiments.
Figure 13:
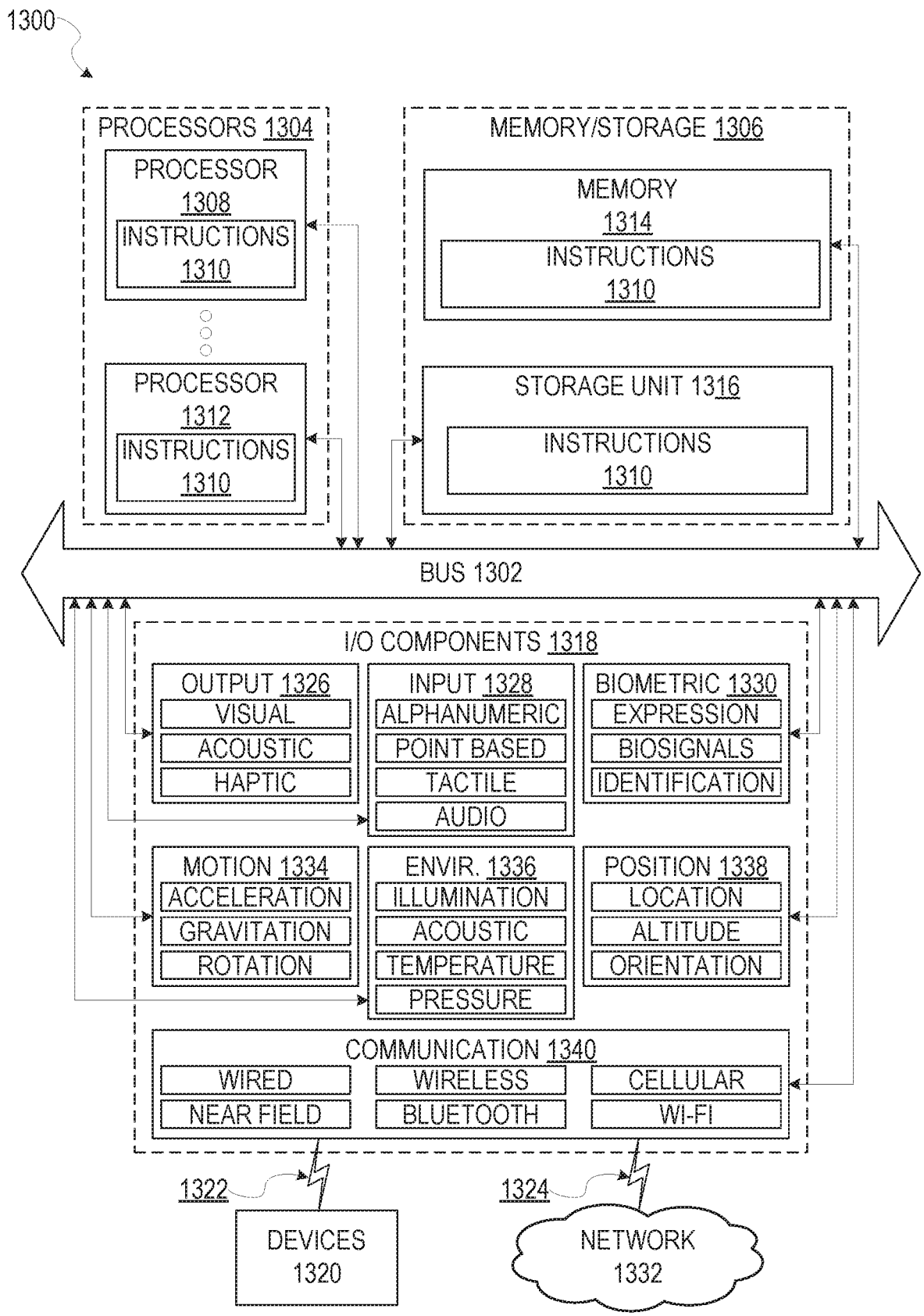
FIG. 13 is a block diagram illustrating components of a machine, according to some example embodiments, able to read instructions from a machine-readable medium (e.g., a machine-readable storage medium) and perform any one or more of the methodologies discussed herein.

FIG. 7 illustrates aspects of a system 700 for image tagging and visual search according to some embodiments. As described above, image data 702 for an image is accessed by a mobile device such as client device 102 or machine 1300 (FIG. 13). The mobile device performs processing operations to generate extended visual search tags which are stored in a search database 732 or any such memory structure of the mobile device. These extended visual search tags are then used to generate a set of search results 734 when a search input is received at the mobile device. The extended visual search tags may be generated by a combination of image tagging and metadata analysis, or in various combinations of analysis with the image tagging operations described herein.

Figure 8:
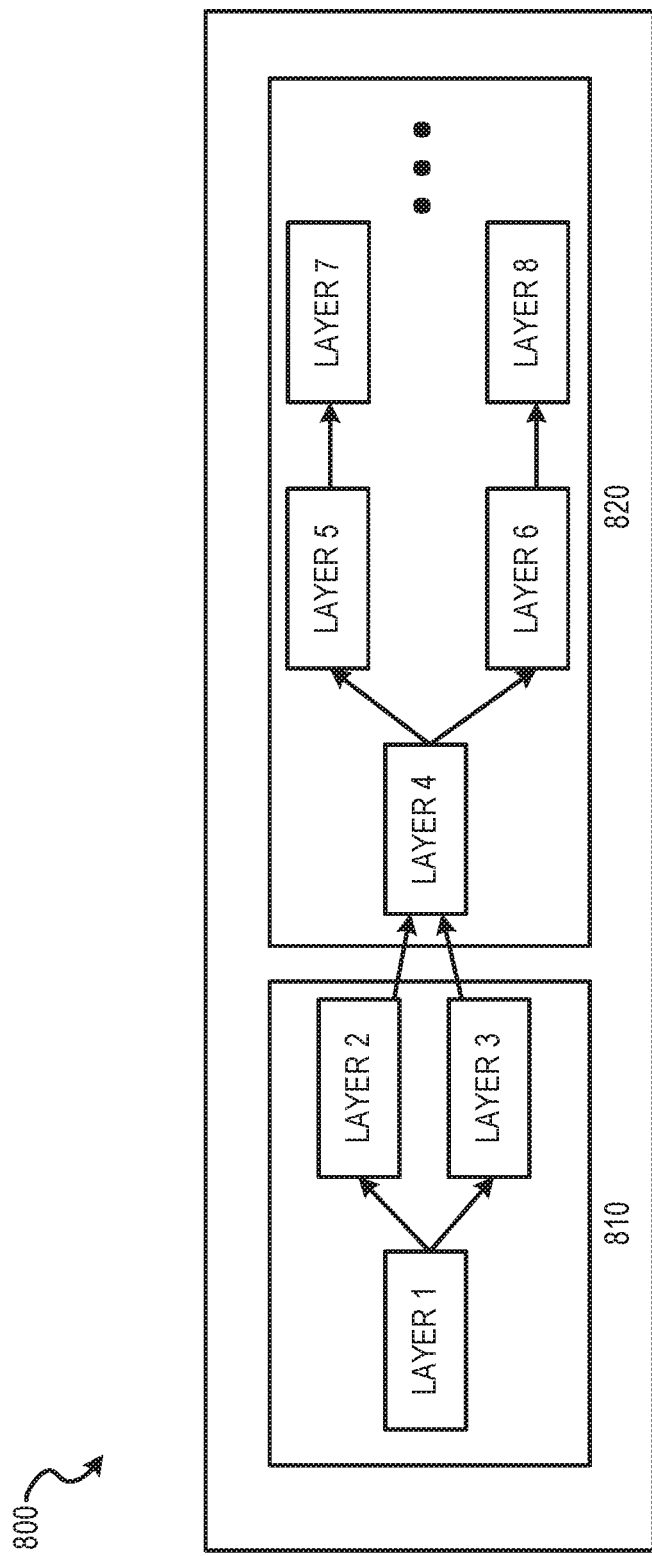
FIG. 8 illustrates aspects of content analysis in accordance with various embodiments described herein.

In the embodiment of FIG. 7, deep convolutional neural network (DCNN) 704 processes image data 702 to generate visual tags 708. In some embodiments, DCNN 704 comprises a neural network structure along with a set of predetermined weights. The weights are determined by prior training of the DCNN 704 using a set number of image recognition tags or items. In other words, the DCNN 704 is trained to recognize a limited number of items. A DCNN 704 trained to recognize a beach and a tree will generate output values associated with "beach" and "tree". The output values are compared with a threshold to determine if a tag for the items is associated with the image in the search database 732. Items in the image but not part of the DCNN training will simply be ignored. The number of items directly scored as part of the object recognition operation performed by DCNN 704 is thus limited, and can vary from tens of items to hundreds of items in some embodiments. As processing resources in mobile devices become more effective, thousands of items may be directly analyzed by a DCNN 704 operating in a resource-constrained mobile device. In such systems, the use of a DCNN described in FIG. 8 provides more efficient resource usage to allow additional items and faster processing in a mobile environment. The use of a knowledge graph 706 may additionally be used to generate more complicated tags from a limited set of items that are directly trained into and analyzed by a DCNN 704.

A set of visual tags 708 are then assigned to the image data 702 based on output values from the DCNN 704. Visual tags 708 include output values for particular items that are part of the DCNN's prior training, including tree with a value of 0.518, grass with a value of 0.434, table with a value of 0.309, and basketball court with a value of 0.309. These values are presented for illustrative purposes, and it is to be understood that different values and items may be used in different embodiments. Visual tags 708 includes items for which the output scores exceed a threshold (e.g., 0.3). Other items, such as beach, cat, dog, car, house, or shoes, may be items that are part of DCNN training, but for which the output values are below the threshold. For those items, no associated tag is generated for image data 702. Additional details of DCNN operation are described below with respect to FIGS. 8 and 9.

In addition to the use of DCNN operations to generate visual tags to assist with visual search, natural language processing or other processing of metadata can be used in conjunction with visual tags 708 to provide more comprehensive search results. Metadata 722 includes data such as location data from a positioning system that captures a device location when image data 702 is generated, as well as time data for a capture time associated with image data 702. Natural language processing 724 can be used to associate both visual tags 708 and metadata 722 with much more complex natural language matches 726 for inclusion in search database 732 and to search results 734 for natural language search inputs.

In various embodiments such as the embodiment of FIG. 7, because tagging, indexing, and ranking are all performed on the device, the search experience is extremely fast. For example, the search autocomplete function returns almost instantly, leading to a much more satisfying user experience than similar server-side autocomplete methods. In addition to traditional keyword/tag matching, semantic matching for image search tags based on natural language processing techniques significantly increase the coverage and quality of the image search experience. In one embodiment, a semantic augmentation technique works by analyzing each word in the search query and matching it semantically to the best possible visual tags generated by the visual recognition algorithm.

One particular embodiment of semantic augmentation comprises a use of ensembles of textual embeddings from a diverse set of very large textual datasets, such as Wikipedia™ and other such text sources. Textual embeddings are projections of words into a low-dimensional space, from which similarity metrics can be derived. Using low-dimensional similarity metrics, the textual embeddings are systematically aggregated, producing candidate lists of synonyms as well as similar words semantically related to the output tags obtained from the visual recognition algorithm. The candidate lists are filtered using heuristics and visual inspection. The output of this process is a database (e.g., search database 732 in some embodiments) of visual tags along with an associated list of synonyms and related words. This abovementioned technique for semantic augmentation of visual tags using natural language processing significantly broadens the coverage of the search results and consequently improves the overall visual search experience.

FIG. 8 illustrates aspects of a DCNN in accordance with various embodiments described herein. A deep neural network structure consists of variant number of basic layers. The partial DCNN structure 800 of FIG. 8 includes layers 1 through 8 In a deep neural network structure there are multiple types of layers, such as a convolution layer, a pooling layer, and a fully-connected layer. From high-level abstraction, the convolution layer(s) and pooling layer(s) serve as feature descriptors (e.g., similar to descriptors for a person like a fingerprint or face description); and the fully-connected layer(s) serve as the classifier. Each layer has associated parameters that are set during a training phase that is used to generate the particular DCNN that is communicated to and used by a mobile device after the parameters have been determined by training. Such neural network models may have tens of millions of parameters, and are extremely computationally expensive. Training, therefore, is conducted remotely via high-resource computing systems, and the parameters and any necessary details of the DCNN are then transferred to mobile devices following training.

Figure 9:
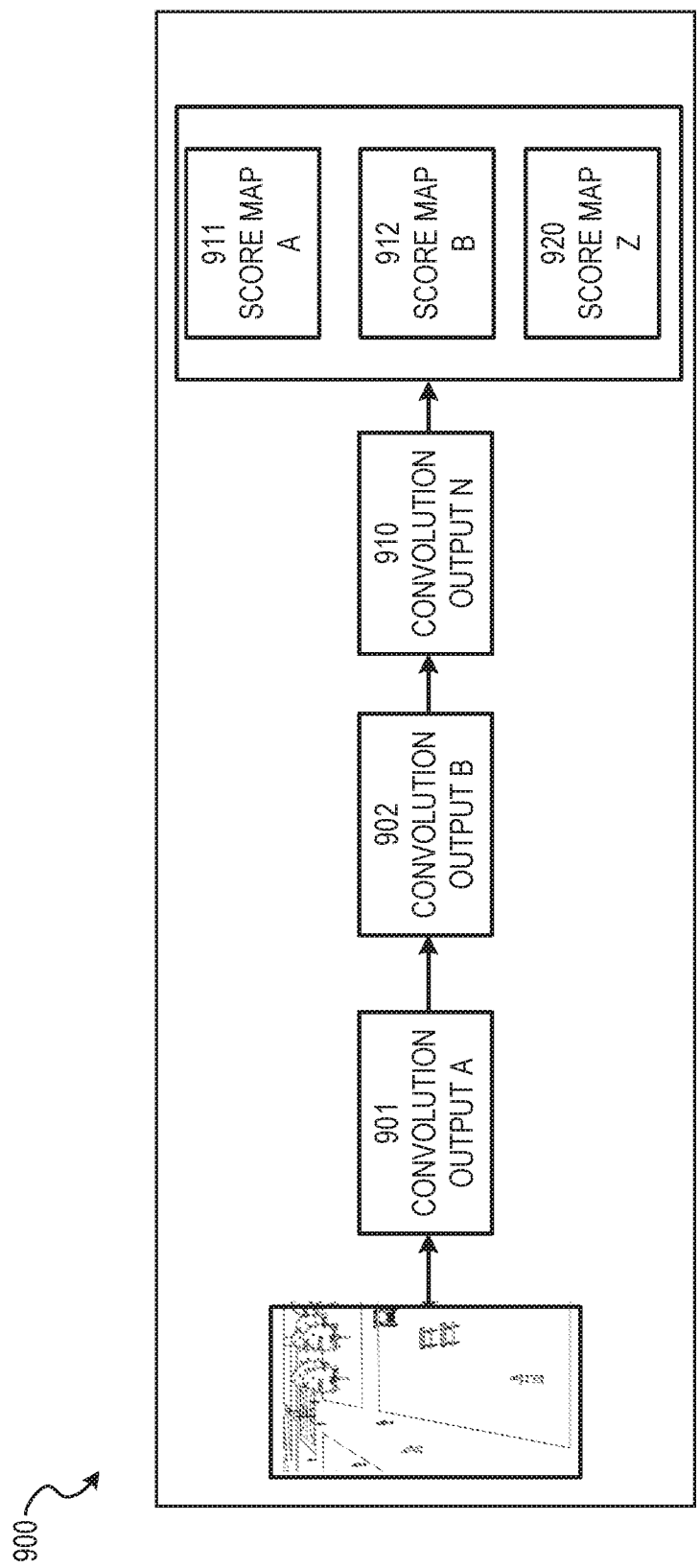
FIG. 9 illustrates aspects of operations for image processing and visual search in accordance with some embodiments.

The convolutional layers are the core of the DCNN models used by various embodiments. The convolutional layer parameters include a set of learnable filters in a matrix form with a height and width less than the image being processed with the DCNN. During a processing operating where image data is analyzed with a DCNN, for a convolutional layer, each filter (also referred to as a kernel) is convolved across the width and height of the input image, computing the dot product between the entries of the filter and the input and producing a two-dimensional activation map of that filter. Sufficient activity associated with a particular kernel indicates that the DCNN was previously trained to identify and tag images using an item or image type (e.g., car, cat, tree) that set the parameters of the particular activated kernel. As illustrated in FIG. 9, multiple convolutional layers, each with associated kernels, may be part of a single DCNN to generate output values for image data.

Convolutional layers of layers 1-8 may generate convolution outputs 901, 902, 910, and etcetera. Such convolution outputs are computed by the following operation of two matrixes (e.g., image data matrix A and kernel matrix B) having sizes $M_A \times N_A$ and $M_B \times N_B$. The resulting convolutional output matrix C is computed as:

$$\Box(\Box,\Box) = \Box_{\Box \in [0,\Box_\Box - 1]} \Box_{\Box \in [0,\Box_\Box - 1]} \Box(\Box,\Box) \Box(\Box - \Box, \Box - \Box) \quad (1)$$

where $\Box \in [0, \Box_\Box + \Box_\Box - 1)$ and $\Box \in [0, \Box_\Box + \Box_\Box - 1)$ Layers 1-8 may additionally include pooling or subsampling layers. A pooling layer is used to reduce the size of output from a convolutional layer. Various embodiments use max-pooling layers (e.g., layers that select the largest value from a subset of the matrix and use that single value to replace multiple other matrix elements) and average-pooling layers (e.g., layers that replace a subset of a matrix with an average value of the replaced matrix elements). For example, in a matrix with 4×4 elements, by applying the max pooling operation on each 2×2 block (generating one output from each 2×2 block), the output would be a 2×2 matrix. In a max-pooling layer, each 2×2 block is replaced with a single element having the value of the highest value element from the previous 2×2 blocks. The four 2×2 blocks of the original 4×4 matrix are thus replaced with single elements to generate a new 2×2 matrix.

A fully connected layer represents that each node at a layer connects to all the nodes from previous layers. Such a layer may be defined mathematically by the inner product of the previous layer's output and the layer parameters.

The embodiment of FIG. 8 illustrates that different layers may connect with other layers in a variety of ways. The layers of a DCNN may thus be structured as subgraphs, or collections of layers where some layers do not pass data to another subgraph directly. Partial DCNN structure 800 includes two subgraphs, shown as subgraph 810 and subgraph 820. Layer 1 is illustrated as passing intermediate data to both layer 2 and layer 3 of subgraph 810, but does not pass data to subgraph 820 (or any other subgraph).

Traditional convolutional neural network-based approaches perform a forward inference sequentially and save all the intermediate outputs. Because an image recognition application typically contains tens of layers in a DCNN, previous DCNN schemas creates tens or hundreds of intermediate output layers that consume memory. To alleviate the intensive memory consumption issue, intermediate layers that do not pass data to another subgraph have their associated intermediate data deleted (e.g., actively deleted or alternatively having the previously used memory made available for other purposes without actively erasing or overwriting bits until needed). Some such embodiments operate by analyzing the dependency of layers (e.g., layers 1-8) in a layer graph (e.g., the layer graph of FIG. 8). For example, such analysis may denote $\{(\Box_\Box)^{\Box=1}, \cdots \Box_\Box$ as layer outputs from layers $\{\Box_\Box\}^{\Box=1, \Box_\Box}$; and denote $\{(\Box_\Box)^{\Box=\Box_{\Box}+1}, \cdots \Box\}$ as all the left layers that haven't performed forward passing. The analysis identifies all the edges which connect subgraph $\{(\Box_\Box)^{\Box=1}, \cdots \Box_\Box$ and subgraph $(\{\Box_\Box\}^{\Box=\Box_{\Box}+1}, \cdots \Box$. All the layer outputs which are not related to the connecting edges will be immediately deleted. Because the deleted layer outputs do not contribute to any following inference, they does not affect the recognition result (e.g., tags associated with an image), and in some embodiments save or otherwise efficiently prevents more than half of the memory consumption over previous DCNN operations.

FIG. 9 then illustrates aspects of visual tagging and visual search in accordance with some embodiments. In addition to the above described subgraph dependency optimization, some embodiments additionally include cross-region feature sharing operations. As described above, in a convolutional layer, a filter/kernel is convolved across the width and height of the input image. In standard operation of prior DCNNs, using multiple windows has been proven to consistently improve object recognition performance. This previous operation is implemented by cropping an input image into multiple sub-windows from an image, and then aggregating the sub-window recognition results. In such known systems, each sub-window is classified independently. There are two obvious drawbacks of this approach: (1) It largely ignores the fact that convolutional outputs in different sub-windows are actually partially shared; and (2) It is costly to crop sub-windows because the running time is linear with respect to the number of crops performed. In embodiments described above, the whole image will be applied to the convolutional kernels layer by layer and will pull out any sub-windows after a final convolutional layer. In this way, the convolutional kernels are only applied once to the overlapping areas of the sub-windows, and this significantly saves the computation resources in a resource-limited mobile environment.

To improve performance in resource-constrained mobile devices, some embodiments use a neural network architecture which contains only convolutional layers except the last prediction layer. During training time (e.g., generation of values on a system with significant resources), the last layer serves as a fully-connected layer to produce classification scores. Following training of the DCNN, this fully connected layer is converted to a convolutional layer. In this way, each convolutional kernel produces a prediction score map for an image category. In such embodiments, the generated framework is capable of obtaining dense sub-window recognition scores by applying convolutional kernels layer by layer to the whole image (instead of cropped sub-windows).

The values generated by training are then used to implement a DCNN on a mobile device. As illustrated by FIG. 9, the trained DCNN 900 includes convolutional outputs 901-910, where the last convolutional output 910 is the convolutional layer converted from the fully connected layer in the training. Using this convolutional output 910 converted from the fully connected layer, score maps 911-920 are generated.

Further still, in addition to various uses of the sublayer dependency memory optimization and the cross-region feature sharing described above, various embodiments use estimated or compressed weight values. Typical DCNN implementations use trained and stored floating point weights to analyze images with 32-bit floating numbers. In order to reduce the memory usage when applying the trained model in the resource-constrained environment of mobile devices described herein, in some embodiments, 16-bit half precision values are used to store the floating point weights, thus saving 50% of memory usage. In another embodiment, 32-bit floating point weights are compressed to 8-bit indices, with original weights quantized into 256 bits. This quantization can be adaptively performed for each layer with clustering methods, such as k-means clustering. Using such compression, the memory size is reduced by about 75%, and the 8-bit weights of each layer are only decompressed when they are needed.

Some embodiments may use a deep convolutional neural network (DCNN) as described above to generate tags for an image in a resource-constrained environment. One method is performed by a resource-limited mobile device, such as client device 102 or a mobile machine, such as the machine 1300 of FIG. 13. In other embodiments, such methods are performed by a device comprising instructions that, when executed by one or more processors of a mobile device, cause the mobile device to perform the tagging methods using DCNN.

One embodiment involves capturing, by an image sensor of the mobile device, a first image. The image sensor may, for example, be an image sensor of I/O components 1318 in some embodiments. The mobile device processes the first image as captured by the image sensor to generate a file comprising the image data at a first pixel resolution associated with a pixel height and a pixel width. Image data for the first image will therefore have a format or resolution corresponding to the pixel height and pixel width, which is later used in the correlation with DCNN convolution kernels. The method further involves accessing, by one or more processors of the mobile device, image data for a first image as stored on the mobile device. The DCNN on the mobile device then begins processing of the image data in an operation using a deep convolutional neural network (DCNN) executed by the one or more processors. The structure of the DCNN includes at least a first subgraph and a second subgraph, the first subgraph comprising at least a first layer and a second layer. Such a structure may include a wide variety of connections between different layers, and may include convolutional layers including convolution and subsampling operations.

As part of the DCNN analysis, various methods include processing, by the mobile device, the image data using at least the first layer of the first subgraph to generate first intermediate output data. The method further then proceeds with processing, by the mobile device, the first intermediate output data using at least the second layer of the first subgraph to generate first subgraph output data, and in response to a determination in an operation that each layer reliant on the first intermediate data has completed processing, the first intermediate data is deleted from the mobile device. As described above, such a deletion may simply involve making the memory space that stored the intermediate data and passed it along for use by a subsequent layer available to store other information. The data may remain in the memory after the deletion until it is specifically overwritten as the memory space is used for other data.

Following this, the DCNN operation proceeds through all the layers, including any repetitions of similar operations or other operations, until output values are generated, and the output values are used to assign one or more tags to the first image based on the output values from the DCNN.

It will be apparent that the operations described may be used in alternative embodiments, with various operations repeated or presented in different orders, and with any number of intermediate operations, as long as the particular combination is operable on a resource-limited mobile device.

Further embodiments may include additional operations that occur following the above-described operations. Such embodiments may involve processing image data for an image using a first layer of a first subgraph to convolve a first kernel with the image data. The kernel is a matrix with a height and width smaller than the corresponding pixel height and width of the image. Thus, as described above, the kernel is convolved with the entire image. Then, the DCNN generates a plurality of output values, where each output value is associated with a corresponding tag representing a possible item in an image. The output value varies based on the strength of the match estimated by the DCNN as previously trained. Each output value of the plurality of output values is compared with a corresponding threshold from the previous operation, and then one or more tags are assigned to the first image based on the comparison. The strength of the output value thus represents the confidence that the image includes the item associated with the particular output value.

In corresponding operations for semantic analysis or natural language processing, metadata associated with the image is captured. Such data may be any data captured by sensors, such as the sensors of I/O components 1318 for machine 1300. Such data may also be user input data rather than sensor data. Examples of such additional data include location data or time data for the position and time when the image was captured by the mobile device. The mobile device processes the tags and the metadata to generate a set of extended search tags. Subsequent operations in some embodiments involve a set of search results that are generated by comparing a user input search term with extended visual search information or tags. The search results may simply be a set of presented images, or may include images along with natural language result indicators identifying why the images are classified as results of the input search. In some embodiments, extended visual search tags (e.g., search information) is stored in a database as part of processing a newly captured image. In other embodiments, an image may be stored with DCNN-produced tags and metadata, and extended visual search tags may only be generated when a user inputs a search.

In addition to the above specifically described embodiments, it will be apparent that other embodiments using the operations and DCNN structures described herein are possible.

Figure 10A:
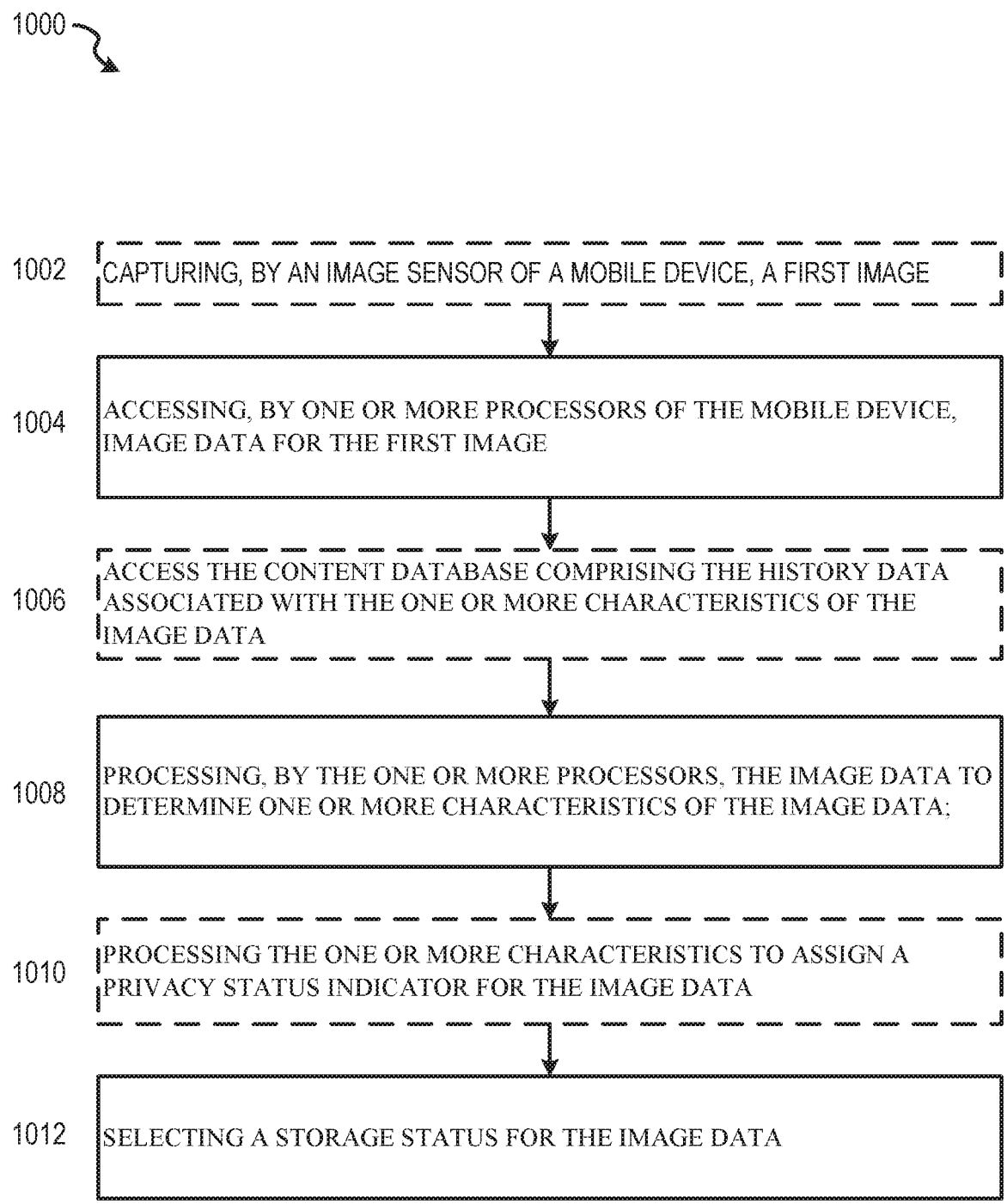
FIG. 10A illustrates aspects of a method for image processing in accordance with embodiments described herein.

FIG. 10A illustrates aspects of a method 1000 for image processing and visual search in accordance with embodiments described herein. In some embodiments, method 1000 is performed by a mobile device or any other such machine as described herein. In other embodiments, method 1000 is embodied by instructions in a non-transitory storage medium that, when executed by one or more processors of a device, cause the device to perform the described operations. Method 1000 begins with optional (as indicated by dashed lines) operation 1002 where an image sensor of a mobile device captures a first image. In other embodiments, the first image may be received in other ways as described herein. Operation 1004 then involves one or more processors of the mobile device accessing image data for a first image. In various embodiments, this access may be an automatic access in response to capture of the image in operation 1002, or may be based on a user input or any other such trigger. In operation 1008, the image data is processed to determine one or more characteristics of the image data. In some embodiments, this is done using history data that is accessed in operation 1006. In other embodiments, the analysis is performed using tag categories or other such information along with machine vision operations, system tag categories, or other such sources.

In some embodiments, further processing of the image data is performed to identify a privacy status in operation 1010. Such a status may be based on the identified content of the image data, metadata such as time and location, user history data, system preference data, user preference data or settings, or any other such determining factors. The analysis is then used to select a storage status for the image data in operation 1012.

Figure 10B:
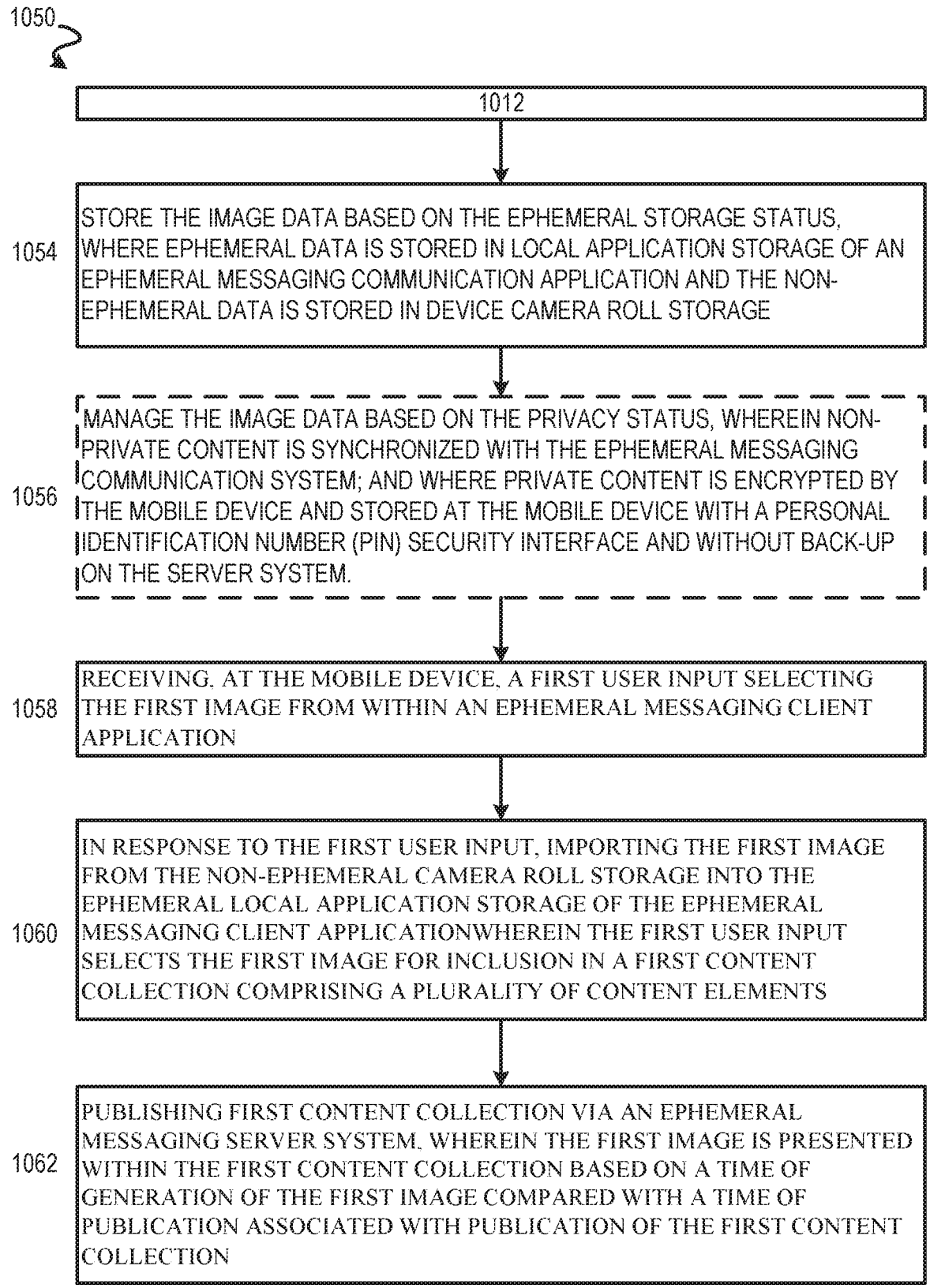
FIG. 10B illustrates aspects of a method for image tagging and storage in accordance with embodiments described herein.

FIG. 10B illustrates aspects of a method 1050 for image tagging and visual search in accordance with embodiments described herein, and may be embodied similarly to method 1000 described above.

Following the operations of method 1000, method 1050 continues with a storage operation performed in operation 1054 following the storage status selection in operation 1012. In operation 1054, the storage status of operation 1012 is used to either store the image data in a non-ephemeral camera roll storage or an ephemeral local application storage.

In embodiments where a privacy determination is made in operation 1010, operation 1056 is used to manage the image data based on the privacy status. Non-private content is synchronized with the ephemeral messaging communication system, and private content is encrypted by the mobile device and stored at the mobile device with a personal identification number (PIN) security interface and without back-up on the server system. In various other embodiments, other operations may be used, with private ephemeral data and private non-ephemeral data subject to different privacy protections as described above.

Following storage of the data, a user may access the data and select it from within an ephemeral messaging client application in operation 1058, regardless of whether the data is in camera roll storage or local application storage. The selection may be associated with a content collection, or may be associated with an ephemeral message. In response to the first user input of operation 1058, non-ephemeral data is imported from the first image from the non-ephemeral camera roll storage into the ephemeral local application storage of the ephemeral messaging client application, and ephemeral data is simply used from within the local application storage in operation 1060. In operation 1062, the content is published, with non-ephemeral content published in a format based on a time of generation of the first image compared with a time of publication associated with publication of the first content collection or transmission of an associated ephemeral message. The image is presented within the first content collection based on the time of capture of the image if the message or content collection is sent or published within a threshold time period of the time of generation of the first image (e.g., within 24 hours of the image capture). If the publication or ephemeral messaging occurs after the threshold time period since the image capture, the image is presented in a frame indicating the time of generation. As discussed above, such content within an ephemeral content collection or ephemeral message has an association deletion trigger, the image may be a still photo or a frame of a video clip, and the image has an associated display time based on ephemeral content display limits (e.g., 10 seconds, or a user-selectable display time less than a maximum threshold value).

Figure 11:
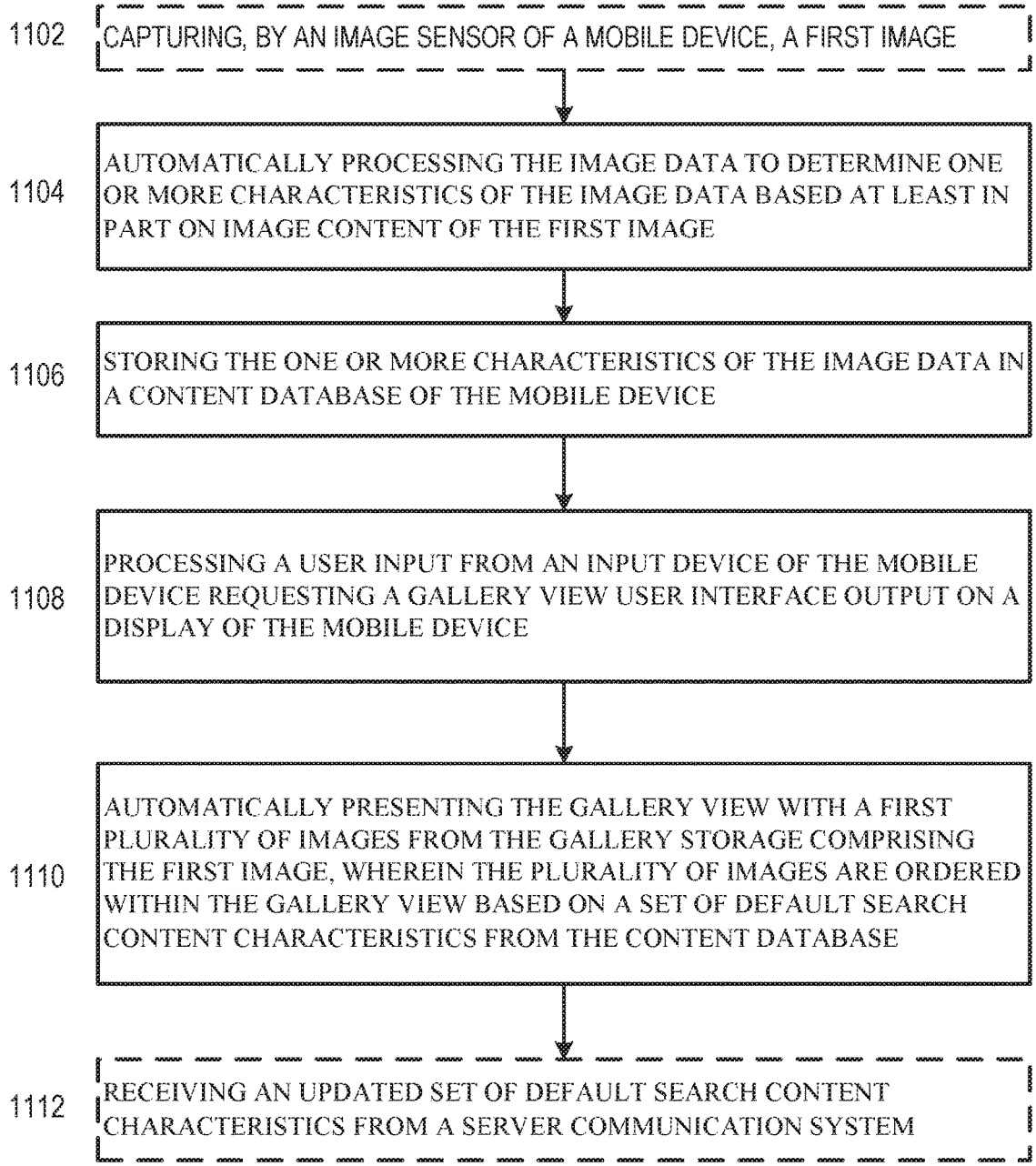
FIG. 11 illustrates aspects of a method for image tagging and visual search in accordance with embodiments described herein.

FIG. 11 illustrates aspects of a method 1100 for image processing and visual search in accordance with embodiments described herein. In some embodiments, method 1100 is performed by a mobile device or any other such machine as described herein. In other embodiments, method 1100 is embodied by instructions in a non-transitory storage medium that, when executed by one or more processors of a device, cause the device to perform the described operations. Method 1100 begins with option operation 1102, were an image sensor of a mobile device captures a first image. In other embodiments, the image may be imported from a camera roll storage into an application storage, or otherwise accessed by a system for analyzing an image and including the image in a search system on a mobile device.

In operation 1104, the mobile device automatically performs processing on the image data to determine one or more characteristics of the image data based at least in part on image content of the first image. Any process for determining content characteristics (e.g. image content such as a ball, grass, trees, capture time, capture location, etc.) described herein, including the use of DCNN analysis, may be used to determine image content of the first image.

Operation 1106 then involves storing the one or more characteristics of the image data in a content database of the mobile device, and operation 1108 involves processing a user input from an input device of the mobile device requesting a gallery view user interface output on a display of the mobile device. Such an input may, for example, be a user touch on a touchscreen input device, or any other such input. In some embodiments, such an input may be a selection of a gallery view user interface option. In other embodiments, the user input may select a search option from within a gallery view. In operation 1110, in response to the user input, the mobile device automatically presents a gallery view with a first plurality of images from the gallery storage comprising the first image, where the plurality of images are ordered within the gallery view based on a set of default search content characteristics from the content database. In some embodiments, the set of default characteristics used for the search result presentation may be automatically selected by an operator of a communication system. As described above, this may enable default search results associated with times of the year (e.g. seasons) periodic times (e.g. weekend nights), certain objects (e.g. food, beach, sporting events, etc) to be updates and selected by a server system. In some embodiments, such updates are optionally performed in operation 1112 by receiving, at the mobile device, an updated set of default search content characteristics from a server communication system. In other embodiments, local user input selections may be used to select such default searches.

Further, after the default searches are presented, an additional search inputs to select image search results other than those for the default searches. In some such embodiments, the searches are limited to suggested sets of search results that are based on the set of characteristics within a content database local to the mobile device. For example, if a local storage associated the content database does not include any images identified as containing food, the option to search food will not be available, and only search selections associated with available characteristics are presented within the search interface.

Similarly, in some embodiments, a default number of searchable content elements must be available to provide searching. For example, in some embodiments, if less than a threshold number (e.g. 20, 30, etc.) content elements are present in a searchable storage, the elements are simply presented with no search options or sorting. If more than the threshold number of elements are present, searching as described herein is enabled. Other embodiments may enable searching and a search based default presentation based on any number of content elements.

Figure 12:
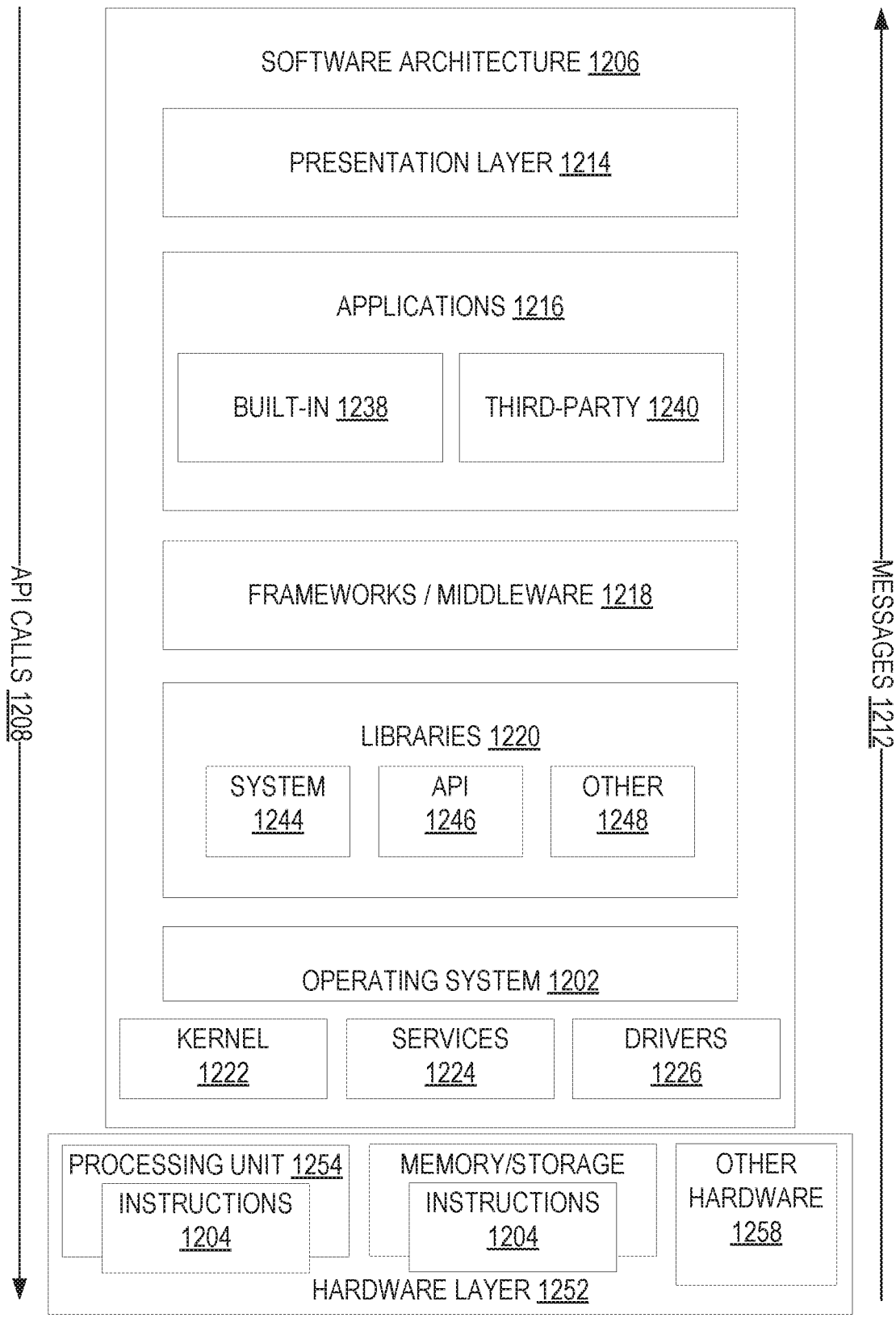
FIG. 12 is a block diagram illustrating a representative software architecture, which may be used in conjunction with various hardware architectures herein described and used to implement various embodiments.

FIG. 12 is a block diagram illustrating an example software architecture 1206, which may be used in conjunction with various hardware architectures herein described. FIG. 12 is a non-limiting example of a software architecture 1206 and it will be appreciated that many other architectures may be implemented to facilitate the functionality described herein. The software architecture 1206 may execute on hardware such as machine 1300 of FIG. 13 that includes, among other things, processors 1304, memory 1314, and I/O components 1318. A representative hardware layer 1252 is illustrated and can represent, for example, the machine 1300 of FIG. 13. The representative hardware layer 1252 includes a processing unit 1254 having associated executable instructions 1204. Executable instructions 1204 represent the executable instructions of the software architecture 1206, including implementation of the methods, components and so forth described herein. The hardware layer 1252 also includes memory and/or storage modules, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, applications 1216 and a presentation layer 1214. Operationally, the applications 1216 and/or other components within the layers may invoke application programming interface (API) API calls 1208 through the software stack and receive messages 1212 in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224 and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers. Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPREG4, H.264, MP3, AAC. AMR. JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built-in operating system functions (e.g., kernel 1222, services 1224 and/or drivers 1226), libraries 1220, and frameworks/middleware 1218 to create user interfaces to interact with users of the system. Alternatively, or additionally, in some systems interactions with a user may occur through a presentation layer, such as presentation layer 1214. In these systems, the application/component "logic" can be separated from the aspects of the application/component that interact with a user.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environment components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1324 and coupling 1322 respectively. For example, the communication components 1340 may include a network interface component or other suitable device to interface with the network 1332. In further examples, communication components 1340 may include wired communication components, wireless communication components, cellular communication components. Near Field Communication (NFC) components. Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a Universal Serial Bus (USB)).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph, MaxiCode, PDF417, Ultra Code. UCC RSS-2D bar code, and other optical codes), or acoustic detection components (e.g., microphones to identify tagged audio signals). In addition, a variety of information may be derived via the communication components 1340, such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory, even if the message is temporarily stored in a non-transitory computer-readable medium.

"MACHINE-READABLE MEDIUM" or "NON-TRANSITORY COMPUTER-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled.

Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors (e.g., processors 1304) that are temporarily configured (e.g., by software) or permanently configured to perform the relevant operations. Whether temporarily or permanently configured, such processors may constitute processor-implemented components that operate to perform one or more operations or functions described herein. As used herein. "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving the date and time of day, sometimes accurate to a small fraction of a second.

What is claimed is:

1. A method of image tagging on a mobile device, comprising:
   accessing, by one or more processors of the mobile device, image data for a first image;
   processing, by the one or more processors, the image data to determine one or more characteristics of the image data;
   processing the one or more characteristics to assign an ephemeral status indicator for the image data; and
   selecting a storage status for the image data based on the ephemeral status indicator for the image data;
   accessing a content database comprising messaging history data associated with the one or more characteristics of the image data, wherein the one or more characteristics are further processed with the messaging history data to assign the ephemeral status indicator for the image data, and wherein the storage status is selected between a non-ephemeral camera roll storage and an ephemeral local application storage;
   storing, based on the ephemeral status indicator, the image data for the first image within the non-ephemeral camera roll storage;
   receiving, at the mobile device, a first user input selecting the first image from within an ephemeral messaging client application;
   in response to the first user input, importing the first image from the non-ephemeral camera roll storage into the ephemeral local application storage of the ephemeral messaging client application, wherein the first user input selects the first image for inclusion in a first content collection comprising a plurality of content elements; and
   publishing, by the mobile device, the first content collection via an ephemeral messaging server system, wherein the first image is presented within the first content collection based on a time of generation of the first image compared with a time of publication associated with publication of the first content collection.

2. The method of claim 1, further comprising:
   capturing, by an image sensor of the mobile device, the image data, wherein the processing the one or more characteristics with the messaging history data to assign an ephemeral status indicator for the image data is performed automatically in response to capture of the image data and prior to selecting the storage status for the image data.

3. The method of claim 1, wherein the first image is presented within the first content collection based on a time of capture of the first image if the first content collection is published within a threshold time period of the time of generation of the first image, and wherein the first image is presented within the first content collection based on the time of publication with a frame indicating the time of generation if the first content collection is published later than the threshold time period after the time of generation of the first image.

4. The method of claim 3, wherein the threshold time period is 24 hours.

5. The method of claim 4, wherein the first image is a frame of a video clip, and
   wherein the video clip has a duration less than an ephemeral content limit associated with the ephemeral messaging communication system.

6. The method of claim 5, wherein each content element of the first content collection is associated with a display duration less than or equal to the ephemeral content limit, and wherein the ephemeral content limit is 10 seconds.

7. The method of claim 6, wherein the storage status is further selected between a private and a non-private storage status,
   wherein non-private content is synchronized with the ephemeral messaging server system, and
   wherein private content is encrypted by the mobile device and stored at the mobile device with a personal identification number (PIN) security interface and without back-up on the ephemeral messaging server system.

8. A mobile device, comprising:
   a memory comprising image data for a first image; and
   one or more processors coupled to the memory and configured to:
   access the image data for the first image;
   process the image data to determine one or more characteristics of the image data;
   process the one or more characteristics to assign an ephemeral status indicator for the image data;
   select a storage status for the image data based on the ephemeral status indicator for the image data;
   access a content database comprising messaging history data associated with the one or more characteristics of the image data, wherein the one or more characteristics are further processed with the messaging history data to assign the ephemeral status indicator for the image data, and wherein the storage status is selected between a non-ephemeral camera roll storage and an ephemeral local application storage;
   store, based on the ephemeral status indicator, the image data for the first image within the non-ephemeral camera roll storage;
   receive, at the mobile device, a first user input selecting the first image from within an ephemeral messaging client application;
   in response to the first user input, import the first image from the non-ephemeral camera roll storage into the ephemeral local application storage of the ephemeral messaging client application, wherein the first user input selects the first image for inclusion in a first content collection comprising a plurality of content elements; and
   publish, by the mobile device, the first content collection via an ephemeral messaging server system, wherein the first image is presented within the first content collection based on a time of generation of the first image compared with a time of publication associated with publication of the first content collection.

9. The mobile device of claim 8, wherein the one or more processors are further configured to:
   capture, by an image sensor of the mobile device, the image data,
   wherein the processing the one or more characteristics with the messaging history data to assign an ephemeral status indicator for the image data is performed automatically in response to capture of the image data and prior to selecting the storage status for the image data.

10. The mobile device of claim 8, wherein the first image is presented within the first content collection based on a time of capture of the first image if the first content collection is published within a threshold time period of the time of generation of the first image, and wherein the first image is presented within the first content collection based on the time of publication with a frame indicating the time of generation if the first content collection is published later than the threshold time period after the time of generation of the first image.

11. The mobile device of claim 10, wherein the first image is a frame of a video clip, and
    wherein the video clip has a duration less than an ephemeral content limit associated with the ephemeral messaging communication system.

12. The mobile device of claim 11, wherein each content element of the first content collection is associated with a display duration less than or equal to the ephemeral content limit, and wherein the ephemeral content limit is 10 seconds.

13. The mobile device of claim 12, wherein the storage status is further selected between a private and a non-private storage status,
    wherein non-private content is synchronized with the ephemeral messaging server system, and
    wherein private content is encrypted by the mobile device and stored at the mobile device with a personal identification number (PIN) security interface and without back-up on the ephemeral messaging server system.

14. A non-transitory storage medium comprising instructions that, when executed by one or more processors of a mobile device, cause the mobile device to perform operations comprising:
    accessing, by one or more processors of the mobile device, image data for a first image;
    processing, by the one or more processors, the image data to determine one or more characteristics of the image data;
    processing the one or more characteristics to assign an ephemeral status indicator for the image data; and
    selecting a storage status for the image data based on the ephemeral status indicator for the image data;
    accessing a content database comprising messaging history data associated with the one or more characteristics of the image data, wherein the one or more characteristics are further processed with the messaging history data to assign the ephemeral status indicator for the image data, and wherein the storage status is selected between a non-ephemeral camera roll storage and an ephemeral local application storage;
    storing, based on the ephemeral status indicator, the image data for the first image within the non-ephemeral camera roll storage;
    receiving, at the mobile device, a first user input selecting the first image from within an ephemeral messaging client application;
    in response to the first user input, importing the first image from the non-ephemeral camera roll storage into the ephemeral local application storage of the ephemeral messaging client application, wherein the first user input selects the first image for inclusion in a first content collection comprising a plurality of content elements; and
    publishing, by the mobile device, the first content collection via an ephemeral messaging server system, wherein the first image is presented within the first content collection based on a time of generation of the first image compared with a time of publication associated with publication of the first content collection.

15. The non-transitory storage medium of claim 14, wherein the instructions further cause the mobile device to perform operations comprising:
    capturing, by an image sensor of the mobile device, the image data,
    wherein the processing the one or more characteristics with the messaging history data to assign an ephemeral status indicator for the image data is performed automatically in response to capture of the image data and prior to selecting the storage status for the image data.

16. The non-transitory storage medium of claim 14 wherein the first image is presented within the first content collection based on a time of capture of the first image if the first content collection is published within a threshold time period of the time of generation of the first image, and wherein the first image is presented within the first content collection based on the time of publication with a frame indicating the time of generation if the first content collection is published later than the threshold time period after the time of generation of the first image.

17. The non-transitory storage medium of claim 16, wherein the threshold time period is 24 hours.

18. The non-transitory storage medium of claim 17, wherein the first image is a frame of a video clip, and
    wherein the video clip has a duration less than an ephemeral content limit associated with the ephemeral messaging communication system.

19. The non-transitory storage medium of claim 18, wherein each content element of the first content collection is associated with a display duration less than or equal to the ephemeral content limit, and wherein the ephemeral content limit is 10 seconds.

20. The non-transitory storage medium of claim 19, wherein the storage status is further selected between a private and a non-private storage status,
    wherein non-private content is synchronized with the ephemeral messaging server system, and
    wherein private content is encrypted by the mobile device and stored at the mobile device with a personal identification number (PIN) security interface and without back-up on the ephemeral messaging server system.

* * * * *